US007783459B2

(12) United States Patent
Rozell et al.

(10) Patent No.: US 7,783,459 B2
(45) Date of Patent: Aug. 24, 2010

(54) ANALOG SYSTEM FOR COMPUTING SPARSE CODES

(75) Inventors: Christopher John Rozell, El Cerrito, CA (US); Don Herrick Johnson, Houston, TX (US); Richard Gordon Baraniuk, Houston, TX (US); Bruno A. Olshausen, San Francisco, CA (US); Robert Lowell Ortman, Houston, TX (US)

(73) Assignee: William Marsh Rice University, Houston, TX (US)

( * ) Notice: Subject to any disclaimer, the term of this patent is extended or adjusted under 35 U.S.C. 154(b) by 294 days.

(21) Appl. No.: 12/035,424

(22) Filed: Feb. 21, 2008

(65) Prior Publication Data

US 2008/0270055 A1 Oct. 30, 2008

Related U.S. Application Data

(60) Provisional application No. 60/902,673, filed on Feb. 21, 2007.

(51) Int. Cl.
*G06F 19/00* (2006.01)

(52) U.S. Cl. .......................... 702/189; 702/71; 341/87; 341/50; 714/801; 714/746; 714/758; 375/240.16; 375/240.22; 382/253

(58) Field of Classification Search .................. 702/71, 702/19, 66, 189; 341/87, 51, 107, 50, 65, 341/67, 94; 382/248, 298, 232, 253; 714/801, 714/746, 758; 375/240.01–240.07, 240.11–240.16, 375/240.19, 240.22, 240.23, 240.26; 704/207, 704/223; 717/150, 157, 160; 345/501, 530, 345/531, 535
See application file for complete search history.

(56) References Cited

U.S. PATENT DOCUMENTS

| | | | | |
|---|---|---|---|---|
| 5,303,058 | A * | 4/1994 | Fukuda et al. | 382/234 |
| 6,298,166 | B1 * | 10/2001 | Ratnakar et al. | 382/248 |
| 7,003,039 | B2 * | 2/2006 | Zakhor et al. | 375/240.22 |
| 7,271,747 | B2 * | 9/2007 | Baraniuk et al. | 341/87 |
| 7,345,603 | B1 * | 3/2008 | Wood et al. | 341/122 |
| 7,450,032 | B1 * | 11/2008 | Cormode et al. | 341/50 |
| 7,584,396 | B1 * | 9/2009 | Cormode et al. | 714/746 |
| 7,646,924 | B2 * | 1/2010 | Donoho | 382/232 |
| 2001/0028683 | A1 * | 10/2001 | Bottreau et al. | 375/240.27 |
| 2003/0058943 | A1 * | 3/2003 | Zakhor et al. | 375/240.12 |
| 2004/0268334 | A1 * | 12/2004 | Muthukumar et al. | 717/160 |
| 2006/0029279 | A1 * | 2/2006 | Donoho | 382/232 |
| 2007/0019723 | A1 * | 1/2007 | Valente | 375/240.12 |
| 2007/0027656 | A1 * | 2/2007 | Baraniuk et al. | 702/189 |
| 2008/0129560 | A1 * | 6/2008 | Baraniuk et al. | 341/87 |
| 2008/0168324 | A1 * | 7/2008 | Xu et al. | 714/758 |

* cited by examiner

*Primary Examiner*—Carol S Tsai
(74) *Attorney, Agent, or Firm*—24 IP Law Group; Timothy R. DeWitt

(57) ABSTRACT

A parallel dynamical system for computing sparse representations of data, i.e., where the data can be fully represented in terms of a small number of non-zero code elements, and for reconstructing compressively sensed images. The system is based on the principles of thresholding and local competition that solves a family of sparse approximation problems corresponding to various sparsity metrics. The system utilizes Locally Competitive Algorithms (LCAs), nodes in a population continually compete with neighboring units using (usually one-way) lateral inhibition to calculate coefficients representing an input in an over complete dictionary.

14 Claims, 14 Drawing Sheets

ANALOG SYSTEM FOR COMPUTING SPARSE CODES

CROSS-REFERENCE TO RELATED APPLICATIONS

The present application claims the benefit of the filing date of U.S. Provisional Patent Application Ser. No. 60/902,673, entitled "System Using Locally Competitive Algorithms for Sparse Approximation" and filed on Feb. 21, 2007 by inventors Christopher John Rozell, Bruno Adolphus Olshausen, Don Herrick Johnson and Richard Gordon Baraniuk.

The aforementioned provisional patent application is hereby incorporated by reference in its entirety.

STATEMENT REGARDING FEDERALLY SPONSORED RESEARCH OR DEVELOPMENT

The present invention was made with government support under the following government grants or contracts: Office of Naval Research Grant Nos. N00014-06-1-0769, N00014-06-1-0829 and N00014-02-1-0353, U.S. Department of Energy Grant No. DE-FC02-01ER25462, and National Science Foundation Grant Nos. ANI-0099148, ANI-0099148 and IIS-0625717. The government has certain rights in the invention.

BACKGROUND OF THE INVENTION

1. Field of the Invention

The present invention relates to a system for computing sparse representations of data, i.e., where the data can be fully represented in terms of a small number of non-zero code elements, and for reconstructing compressively sensed images.

2. Brief Description of the Related Art

Natural signals can be well-approximated by a small subset of elements from an over complete dictionary. The process of choosing a good subset of dictionary elements along with the corresponding coefficients to represent a signal is known as sparse approximation. Sparse approximation is a difficult non-convex optimization problem that is at the center of much research in mathematics and signal processing. Existing sparse approximation algorithms suffer from one or more of the following drawbacks: 1) they are not implementable in parallel computational architectures; 2) they have difficulty producing exactly sparse coefficients in finite time; 3) they produce coefficients for time-varying stimuli that contain inefficient fluctuations, making the stimulus content more difficult to interpret; or 4) they only use a heuristic approximation to minimizing a desired objective function.

Given an N-dimensional stimulus $s\in\mathbb{R}^N$, we seek a representation in terms of a dictionary D composed of M vectors $\{\phi_m\}$ that span the space $\mathbb{R}^N$. Define the $l^p$ norm of the vector x to be $\|x\|_p=(\Sigma|x_m|^p)^{1/p}$ and the inner product (projection) between x and y to be $<x, y>=\Sigma x_m y_m$. Without loss of generality, assume the dictionary vectors are unit-norm, $\|\phi_m\|_2=1$. When the dictionary is overcomplete (M>N), there are an infinite number of ways to choose coefficients $\{a_m\}$ such that $$s=\sum_{m=1}^{M} a_m\phi_m.$$

In optimal sparse approximation, we seek the coefficients having the fewest number of non-zero entries by solving the minimization problem $$\min_a\|a\|_0 \text{ subject to } s=\sum_{m=1}^{M} a_m\phi_m, \tag{1}$$

where the $l^0$ "norm" denotes the number of non-zero elements of $a=[a_1, a_2, \ldots, a_M]$. While this clearly is not a norm in the mathematical sense, the term here will be used as it is prevalent in the literature. Unfortunately, this combinatorial optimization problem is NP-hard.

In the signal processing community, two approaches are typically used on digital computers to find acceptable suboptimal solutions to this intractable problem. The first general approach substitutes an alternate sparsity measure to convexify the $l^0$ norm. One well-known example is Basis Pursuit (BP) (Chen et al., 2001), which replaces the $l^0$ norm with the $l^1$ norm $$\min_a\|a\|_1 \text{ subject to } s=\sum_{m=1}^{M} a_m\phi_m. \tag{2}$$

Despite this substitution, BP has the same solution as the optimal sparse approximation problem (Donoho and Elad, 2003) if the signal is sparse compared to the nearest pair of dictionary elements $$\left(\text{e.g., } \|a\|_0<\min_{m\neq n}\frac{1}{2}[1+1/\langle\phi_m,\phi_n\rangle]\right).$$

In practice, the presence of signal noise often leads to using a modified approach called Basis Pursuit De-Noising (BPDN) (Chen et al., 2001) that makes a tradeoff between reconstruction mean-squared error (MSE) and sparsity in an unconstrained optimization problem:

$$\min_a\left(\left\|s-\sum_{m=1}^{M}a_m\phi_m\right\|_2^2+\lambda\|a\|_1\right), \tag{3}$$

where $\lambda$ is a tradeoff parameter. BPDN provides the $l^1$-sparsest approximation for a given reconstruction quality. There are many algorithms that can be used to solve the BPDN optimization problem, with interior point-type methods being the most common choice.

The second general approach employed by signal processing researchers uses iterative greedy algorithms to constructively build up a signal representation (Tropp, 2004). The canonical example of a greedy algorithm is known in the signal processing community as Matching Pursuit (MP) (Mallat and Zhang, 1993). The MP algorithm is initialized with a residual $r_0=s$. At the $k^{th}$ iteration, MP finds the index of the single dictionary element best approximating the current residual signal, $\theta_k=\arg\max_m|\langle r_{k-1},\phi_m\rangle|$. The coefficient $d_k=\langle r_{k-1},\phi_{\theta_k}\rangle$ and index $\theta_k$ are recorded as part of the reconstruction, and the residual is updated, $r_k=r_{k-1}-\phi_{\theta_k}d_k$. After K iterations, the signal approximation using MP is given by $$\hat{s} = \sum_{k=1}^{K} \phi_{\theta_k} d_k.$$

Though they may not be optimal in general, greedy algorithms often efficiently find good sparse signal representations in practice.

Recent research has found compelling evidence that the properties of V1 population responses to natural stimuli may be the result of a sparse approximation. For example, it has been shown that V1 receptive fields are consistent with optimizing the coefficient sparsity when encoding natural images. Additionally, V1 recordings in response to natural scene stimuli show activity levels (corresponding to the coefficients $\{a_m\}$) becoming sparser as neighboring units are also stimulated. These populations are typically very overcomplete, allowing great flexibility in the representation of a stimulus. Using this flexibility to pursue sparse codes might offer many advantages to sensory neural systems, including enhancing the performance of subsequent processing stages, increasing the storage capacity in associative memories, and increasing the energy efficiency of the system.

However, existing sparse approximation algorithms do not have implementations that correspond both naturally and efficiently to parallel computational architectures such as those seen in neural populations or in analog hardware. For convex relaxation approaches, a network implementation of BPDN can be constructed, following the common practice of using dynamical systems to implement direct gradient descent optimization. Unfortunately, this implementation has two major drawbacks. First, it lacks a natural mathematical mechanism to make small coefficients identically zero. While the true BPDN solution would have many coefficients that are exactly zero, direct gradient methods to find an approximate solution in finite time produce coefficients that merely have small magnitudes. Ad hoc thresholding can be used on the results to produce zero-valued coefficients, but such methods lack theoretical justification and can be difficult to use without oracle knowledge of the best threshold value. Second, this implementation requires persistent (two-way) signaling between all units with overlapping receptive fields (e.g., even a node with a nearly zero value would have to continue sending inhibition signals to all similar nodes). In greedy algorithm approaches, spiking neural circuits can be constructed to implement MP. Unfortunately, this type of circuit implementation relies on a temporal code that requires tightly coupled and precise elements to both encode and decode.

Beyond implementation considerations, existing sparse approximation algorithms also do not consider the time-varying signals common in nature. A time-varying input signal s(t) is represented with a set of time-varying coefficients $\{a_m(t)\}$. While temporal coefficient changes are necessary to encode stimulus changes, the most useful encoding would use coefficient changes that reflect the character of the stimulus. In particular, sparse coefficients should have smooth temporal variations in response to smooth changes in the image. However, most sparse approximation schemes have a single goal: select the smallest number of coefficients to represent a fixed signal. This single-minded approach can produce coefficient sequences for time-varying stimuli that are erratic, with drastic changes not only in the values of the coefficients but also in the selection of which coefficients are used. These erratic temporal codes are inefficient because they introduce uncertainty about which coefficients are coding the most significant stimulus changes, thereby complicating the process of understanding the changing stimulus content.

There are several sparse approximation methods that do not fit into the two primary approaches of pure greedy algorithms or convex relaxation. Methods such as Sparse Bayesian Learning, FOCUSS, modifications of greedy algorithms that select multiple coefficients on each iteration and MP extensions that perform an orthogonalization at each step involve computations that would be very difficult to implement in a parallel, distributed architecture. For FOCUSS, there also exists a dynamical system implementation that uses parallel computation to implement a competition strategy among the nodes (strong nodes are encouraged to grow while weak nodes are penalized), however it does not lend itself to forming smooth time-varying representations because coefficients cannot be reactivated once they go to zero.

There are also several sparse approximation methods built on a parallel computational framework that are related to our LCAs. These algorithms typically start with many superthreshold coefficients and iteratively try to prune the representation through a thresholding procedure, rather than charging up from zero as in our LCAs. In addition, most of these algorithms are not explicitly connected to the optimization of a specific objective function.

SUMMARY OF THE INVENTION

In a preferred embodiment, the present invention is a parallel dynamical system based on the principles of thresholding and local competition that solves a family of sparse approximation problems corresponding to various sparsity metrics. In our Locally Competitive Algorithms (LCAs), nodes in a population continually compete with neighboring units using (usually one-way) lateral inhibition to calculate coefficients representing an input in an overcomplete dictionary. Our continuous-time LCA is described by the dynamics of a system of nonlinear ordinary differential equations (ODEs) that govern the internal state and external communication of units in a parallel computational environment. These systems use computational primitives that correspond to simple analog elements (e.g., resistors, capacitors, amplifiers), making them realistic for parallel implementations. These systems could be physically implemented in a variety of substrates, including analog hardware elements, organic tissue (e.g., neural networks) or in nanophotonic systems. Each LCA corresponds to an optimal sparse approximation problem that minimizes an energy function combining reconstruction mean-squared error (MSE) and a sparsity-inducing cost function.

In another embodiment, the present invention is a neural architecture for locally competitive algorithms ("LCAs") that correspond to a broad class of sparse approximation problems and possess three properties critical for a neurally plausible sparse coding system. First, the LCA dynamical system is stable to guarantee that a physical implementation is well-behaved. Next, the LCAs perform their primary task well, finding codes for fixed images that are have sparsity comparable to the most popular centralized algorithms. Finally, the LCAs display inertia, coding video sequences with a coefficient time series that is significantly smoother in time than the coefficients produced by other algorithms. This increased coefficient regularity better reflects the smooth nature of natural input signals, making the coefficients much more predictable and making it easier for higher-level structures to identify and understand the changing content in the time-varying stimulus.

The parallel analog architecture described by our LCAs could greatly benefit the many modern signal processing applications that rely on sparse approximation. While the principles we describe apply to many signal modalities, we will focus on the visual system and the representation of video sequences.

In a preferred embodiment, the present invention is an analog system for sparsely approximating a signal. The system comprises a matching system for calculating and outputting matching signals representative of how well-matched said signal is to a plurality of dictionary elements and a plurality of nodes. Each node receives one of said matching signals from said matching system. Each node comprises a source of an internal state signal and a thresholding element. The internal state signal in each node is calculated as a function of said matching signal received at said node and weighted outputs of all other nodes. The source of an internal state signal may comprise a low pass averaging system. The matching system may comprise a projection system for projecting a signal vector onto the plurality of dictionary elements. Each node may further comprise a plurality of weighting elements, each weighting element receiving an output from another one of the plurality of nodes and providing the weighted outputs to the source of an internal state signal. The internal state signal may be derived from the matching signal less a sum of weighted outputs from the other nodes. Alternatively, each node may further comprise a plurality of weighting elements for receiving an output of the thresholding element and providing a plurality of weighted outputs. The inputted signal may be a video signal or other type of signal. The source of an internal state signal may be a voltage source, current source or other source of electrical energy. The low pass averaging system may comprise a low pass averaging circuit such as a resistor and capacitor or any other type of low pass averaging circuit.

In another embodiment, the present invention is a parallel dynamical system for computing sparse representations of data. The system comprises a projection system for projecting the data onto projection vectors and a plurality of nodes. Each node receives one of the projection vectors from the projection system. Each node comprises a source of electrical energy, a low pass averaging circuit and a thresholding element. The source of electrical energy in each node comprises a projection vector received at the node less weighted outputs of all other nodes. Each node further comprises a plurality of weighting elements, each weighting element receiving an output from another one of the plurality of nodes and providing the weighted output to the source of electrical energy. Other arrangements of the weighting elements may be used with the present invention and with this embodiment.

In still another embodiment, the present invention is a parallel dynamical system for computing sparse representations of data. The system comprises a plurality of nodes, each node being active or inactive. Each node comprises a leaky integrator element, wherein inputs to the leaky integrator element cause an activation potential to charge up, and a thresholding element for receiving the activation potential and for producing an output coefficient. The output coefficient is the result of an activation function applied to the activation potential and parameterized by a system threshold. Active nodes inhibit other nodes with inhibition signals proportional to both level of activity of the active nodes and a similarity of receptive fields of the active nodes.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description, or may be learned by practice of the invention.

BRIEF DESCRIPTION OF THE DRAWINGS

For a more complete understanding of the present invention and the advantages thereof, reference is now made to the following description and the accompanying drawings, in which:

FIG. 1(*b*) is a diagram of a system in accordance with a preferred embodiment of the present invention showing the inhibition signals being sent between nodes. In this case, only node 2 is shown as being active (i.e., having a coefficient above threshold) and inhibiting its neighbors. Since the neighbors are inactive then the inhibition is one-way.

FIG. 1 (*c*) illustrates a source of electrical energy in a node in accordance with a preferred embodiment of the present invention.

FIG. 2(*a*) illustrates a sigmoidal threshold function. FIG. 2(*b*) illustrates a cost function for $\gamma=5$, $\alpha=0$ and $\lambda=1$. FIG. 2(*c*) illustrates the ideal hard thresholding function ($\gamma=\infty$, $\alpha=0$. $\lambda=1$) and FIG. 2(*d*) illustrates the corresponding cost function. The dashed line shows the limit, but coefficients produced by the ideal thresholding function cannot take values in this range. FIG. 2(*e*) illustrates the ideal soft thresholding function ($\gamma=\infty$, $\alpha=1$, $\lambda=1$) and FIG. 2(*f*) illustrates the corresponding cost function.

FIG. 4(*b*) illustrates an input vector having a sparse representation in just a few dictionary elements.

FIG. 4(*c*) illustrates an MP initially choosing an "extra" dictionary element, preventing it from finding the optimally sparse representation (coefficients shown after 100 iterations).

FIG. 4(*d*) illustrate that, in contrast, the HLCA system finds the optimally sparse coefficients.

FIG. 4(*e*) illustrates how the time-dynamics of the HLCA system illustrate its advantage. The "extra" dictionary element is the first node to activate, followed shortly by the nodes corresponding to the optimal coefficients. The collective inhibition of the optimal nodes causes the "extra" node to die away.

FIG. 6(*a*) shows the MSE decay and FIG. 6(*b*) shows the $l^0$ sparsity for HLCA. FIG. 6(*c*) illustrates the MSE decay and FIG. 6(*d*) illustrates the $l^0$ sparsity for SLCA. The error converges within 1-2 time constants and the sparsity often approximately converges within 3-4 time constants. In some cases sparsity is reduced with a longer running time.

FIG. 8(*a*) shows Per-frame MSE for each coding scheme, designed to be approximately equal. FIG. 8(*b*) shows the number of active coefficients in each frame. FIG. 8(*c*) shows the number of changing coefficient locations for each frame, including the number of inactive nodes becoming active and the number of active nodes becoming inactive. FIG. 8(*d*) shows the ratio of changing coefficients to active coefficients. A ratio near 2 (such as with MP) means that almost 100% of the coefficient locations are new at each frame. A ratio near 0.5 (such as with HLCA) means that approximately 25% of the coefficients are new at each frame.

FIG. 9(*b*) shows the transition probabilities denoting the probability of a node in one state transitioning to another state on the next frame. For example, P (0|+) is the probability that a node with an active positive coefficient will be inactive (i.e., zero) in the next frame.

FIG. 10(*b*) illustrates the empirical conditional entropy of the coefficient states (–,0,+) during the test video sequence.

FIG. 10(*c*) illustrates the conditional entropy is calculated analytically while varying P (+|+) and equalizing all other transition probabilities to the values seen in HLCA and MP. The tendency of a system to group non-zero states together is the most important factor in determining the entropy.

DETAILED DESCRIPTION OF THE PREFERRED EMBODIMENTS

Figure 1A:
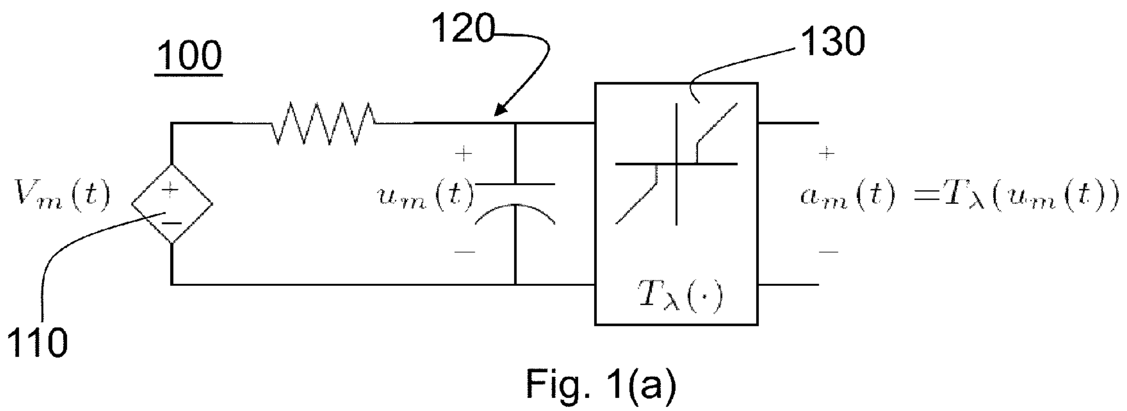
FIG. 1(*a*) illustrates LCA nodes in accordance with a preferred embodiment of the present invention behaving as leaky integrators, charging with a speed that depends on how well the input matches the associated dictionary element and the inhibition received from other nodes.

Digital systems waste time and energy digitizing information that eventually is thrown away during compression. In contrast, the present invention is an analog system that compresses data before digitization, thereby saving time and energy that would have been wasted. More specifically, the present invention is a parallel dynamical system for computing sparse representations of data, i.e., where the data can be fully represented in terms of a small number of non-zero code elements. Such a system could be envisioned to perform data compression before digitization, reversing the resource wasting common in digital systems.

A technique referred to as compressive sensing permits a signal to be captured directly in a compressed form rather than recording raw samples in the classical sense. With compressive sensing, only about 5-10% of the original number of measurements need to be made from the original analog image to retain a reasonable quality image. In compressive sensing, however, reconstruction involves solving an optimal sparse approximation problem which requires enormous calculations and memory. The present invention employs a locally competitive algorithm ("LCA") that stylizes interacting neuron-like nodes to solve the sparse approximation problem.

More specifically, the present invention uses thresholding functions to induce local (possibly one-way) inhibitory competitions among units, thus constituting a locally competitive algorithm (LCA). The LCA can be implemented as a circuit and can be shown to minimize weighted combination of mean-squared-error in describing the data and a cost function on neural activity. It demonstrates sparsity levels comparable to existing sparse coding algorithms, but in contrast to greedy algorithms that iteratively select the single best element, the circuit allows continual interaction among many units, allowing the system to reach more optimal solutions. Additionally, the LCA coefficients for video sequences demonstrate inertial properties that are both qualitatively and quantitatively more regular, i.e., smoother and more predictable, than the coefficients produced by greedy algorithms.

The LCAs associate each node with an element of a dictionary $\phi_m \in D$. When the system is presented with an input image s(t), the collection of nodes evolve according to fixed dynamics (described below) and settle on a collective output $\{a_m(t)\}$, corresponding to the short-term average firing rate of the nodes. For analytical simplicity, positive and negative coefficients are allowed, but rectified systems could use two physical units to implement one LCA node. The goal is to define the LCA system dynamics so that few coefficients have non-zero values while approximately reconstructing the input, $\hat{s}(t)=\Sigma_m a_m(t)\phi_m \approx s(t)$.

The LCA dynamics follow several properties observed in neural systems: inputs cause the membrane potential to "charge up" like a leaky integrator; membrane potentials over a threshold produce "action potentials" for extra cellular signaling; and these super-threshold responses inhibit neighboring nodes through lateral connections. Each node's sub-threshold value is represented by a time-varying internal state $u_m(t)$. The node's excitatory input current is proportional to how well the image matches with the node's receptive field, $b_m(t)=\langle \phi_m, s(t) \rangle$. When the internal state $u_m$ of a node becomes significantly large, the node becomes "active" and produces an output signal amused to represent the stimulus and inhibit other nodes. This output coefficient is the result of an activation function applied to the membrane potential, $a_m=T_\lambda(u_m)$, parameterized by the system threshold λ. Though similar activation functions have traditionally taken a sigmoidal form, we consider activation functions that operate as thresholding devices (e.g., essentially zero for values below λ and essentially linear for values above λ).

The nodes best matching the stimulus will have internal state variables that charge at the fastest rates and become active soonest. To induce the competition that allows these nodes to suppress weaker nodes, we have active nodes inhibit other nodes with an inhibition signal proportional to both their activity level and the similarity of the nodes' receptive fields. Specifically, the inhibition signal from the active node m to any other node n is proportional to $a_m G_{m,n}$, where $G_{m,n}=\langle\phi_m,\phi_n\rangle$. The possibility of unidirectional inhibition gives strong nodes a chance to prevent weaker nodes from becoming active and initiating counter-inhibition, thus making the search for a sparse solution more energy efficient. Note that unlike the direct gradient descent methods described above that require two-way inhibition signals from all nodes that overlap (i.e., have $G_{m,n}=0$), LCAs only require one-way inhibition from a small selection of nodes (i.e., only the active nodes). Putting all of the above components together, LCA node dynamics are expressed by the non-linear ordinary differential equation (ODE)

$$\dot{u}_m(t) = \frac{1}{\tau}\left[b_m(t) - u_m(t) - \sum_{n\neq m} G_{m,n}a_n(t)\right]. \quad (4)$$

Figure 1B:
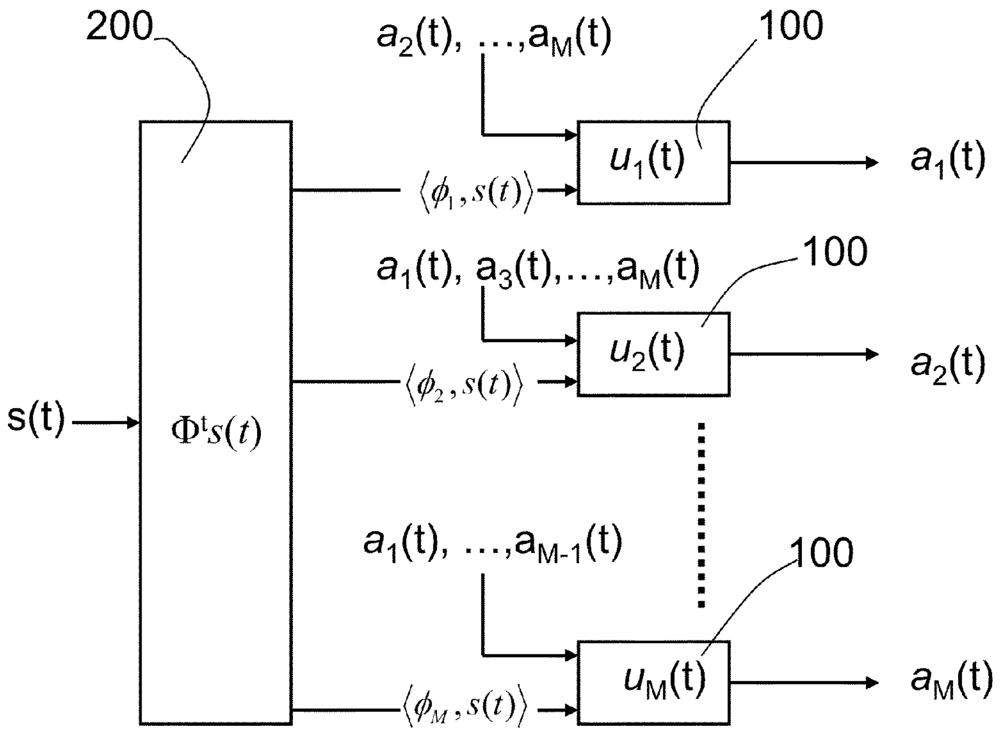
Figure 1C:
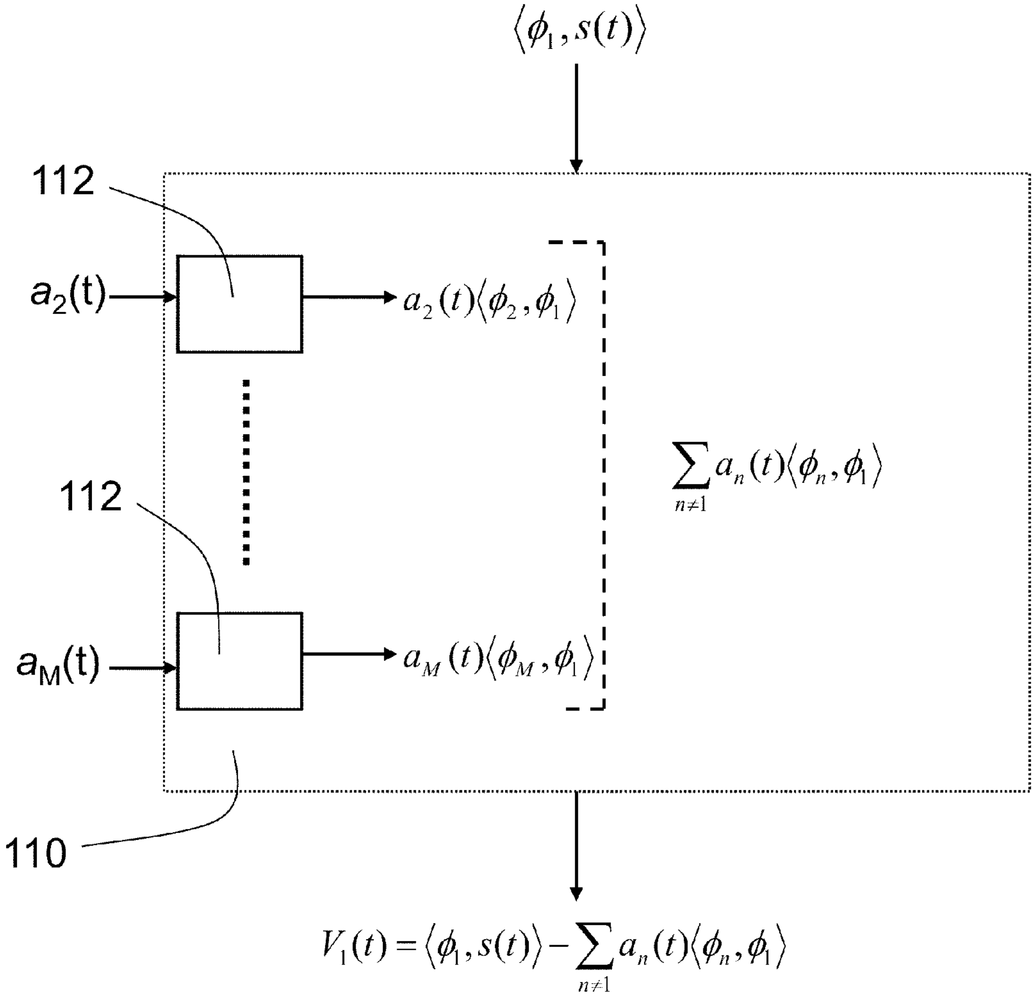

This ODE is essentially the same form as the well-known continuous Hopfield network. FIG. 1(*a*) shows an LCA node circuit schematic and FIG. 1(*b*) is a system diagram illustrating the lateral inhibition. As shown in FIG. 1(*a*), the node 100 has a source of electrical energy 110, a low pass averaging circuit 120 comprised of a resistor and a capacitor, and a thresholding element 130. While the source of electrical energy 110 is shown in FIG. 1(*a*) as a voltage source, other arrangements such as a current source may be used in the present invention and such alternatives will readily apparent to those of ordinary skill in the art. Likewise, while the low pass averaging circuit 120 is shown as a simple resistor and capacitor arrangement in FIG. 1(*a*), other arrangements may be used with the present invention and will be readily apparently to those of ordinary skill in the art.

An embodiment of the source of electrical energy 110 is shown in greater detail in FIG. 1(*c*). As can be seen from FIG. 1(*c*), the source 110 is not a "source" in the sense that it generates electrical energy, but rather, it uses received signals to produce or "compute" the output provided to the low pass averaging circuit 120 and the thresholding element 130. More specifically, the source 110 receives a projection vector $\langle\phi_n,s(t)\rangle$ from a projection system 200 (shown in FIG. 1(*b*)) and an output $a_n(t)$ from each other node 100. In the embodiment shown in FIG. 1(*c*), the source 110 in each node 100 has a weighting element 112 corresponding to the output received from each other node for weighting that output. The source 110 outputs the difference $$V_m(t) = \langle\phi_m, s(t)\rangle - \sum_{n\neq m} T_\lambda(u_n(t))\langle\phi_m,\phi_n\rangle.$$

As illustrated in FIG. 1(*b*), a preferred embodiment of the analog system for compressing signals of the present invention has a projection system 200 for projecting a received signal s(t) onto a plurality of projection vectors $\langle\phi_n, s(t)\rangle$ that are then provided to a plurality of nodes 100. In the embodiment shown in FIG. 1(*b*), each node 100 receives a projection vector $\langle\phi_n, s(t)\rangle$ and also the output $a_n(t)$ of each other node.

Other arrangement of the system of the present invention may be used and will be apparent to those of skill in the art. For example, while the embodiment of FIGS. 1(*a*)-(*c*) show the output of each node being pass directly back to each other node and the weighting of such outputs being performed inside the receiving node, each node could calculate the weighting of its own output $a_n(t)$ and could then pass its own weighted output $a_n(t)\langle\phi_n,\phi_m\rangle$ to the other nodes.

To express the system of coupled non-linear ODEs that govern the whole dynamic system, we represent the internal state variables in the vector $u(t)=[u_1(t), \ldots, u_M(t)]^t$, the active coefficients in the vector $a(t)=[a_1(t), \ldots, a_M(t)]^t=T_\lambda(u(t))$, the dictionary elements in the columns of the (N×M) matrix $\Phi=[\phi_1, \ldots, \phi_M]$ and the driving inputs in the vector $b(t)=[b_1(t), \ldots, b_M(t)]^t=\Phi^t s(t)$. The function $T_\lambda(\bullet)$ performs element-by-element thresholding on vector inputs. The stimulus approximation is $\hat{s}(t)=\Phi a(t)$, and the full dynamic system equation is $$\dot{u}(t) = f(u(t)) = \frac{1}{\tau}[b(t) - u(t) - (\Phi^t\Phi - I)a(t)], \quad (5)$$
$$a(t) = T_\lambda(u(t)).$$

The LCA architecture described by equation (5) solves a family of sparse approximation problems corresponding to different sparsity measures. Specifically, LCAs descend an energy function combining the reconstruction MSE and a sparsity-inducing cost penalty C(•), $$E(t) = \frac{1}{2}\|s(t) - \hat{s}(t)\|^2 + \lambda\sum_m C(a_m(t)). \quad (6)$$

The specific form of the cost function C(•) is determined by the form of the thresholding activation function $T_\lambda(\bullet)$. For a given threshold function, the cost function is specified (up to a constant) by $$\lambda\frac{dC(a_m)}{da_m} = u_m - a_m = u_m - T_\lambda(u_m). \quad (7)$$

This correspondence between the thresholding function and the cost function can be seen by computing the derivative of E with respect to the active coefficients, $\{a_m\}$. If equation (7) holds, then letting the internal states $\{u_m\}$ evolve according to $$\dot{u}_m \alpha - \frac{\partial E}{\partial a_m}$$

yields the equation for the internal state dynamics above in equation (4). Note that although the dynamics are specified through a gradient approach, the system is not performing direct gradient descent $\left(\text{e.g., } \dot{u}_m \neq -\frac{\partial E}{\partial u_m}\right).$ As long as $a_m$ and $u_m$ are related by a monotonically increasing function, the $\{a_m\}$ will also descend the energy function E.

Figure 2:
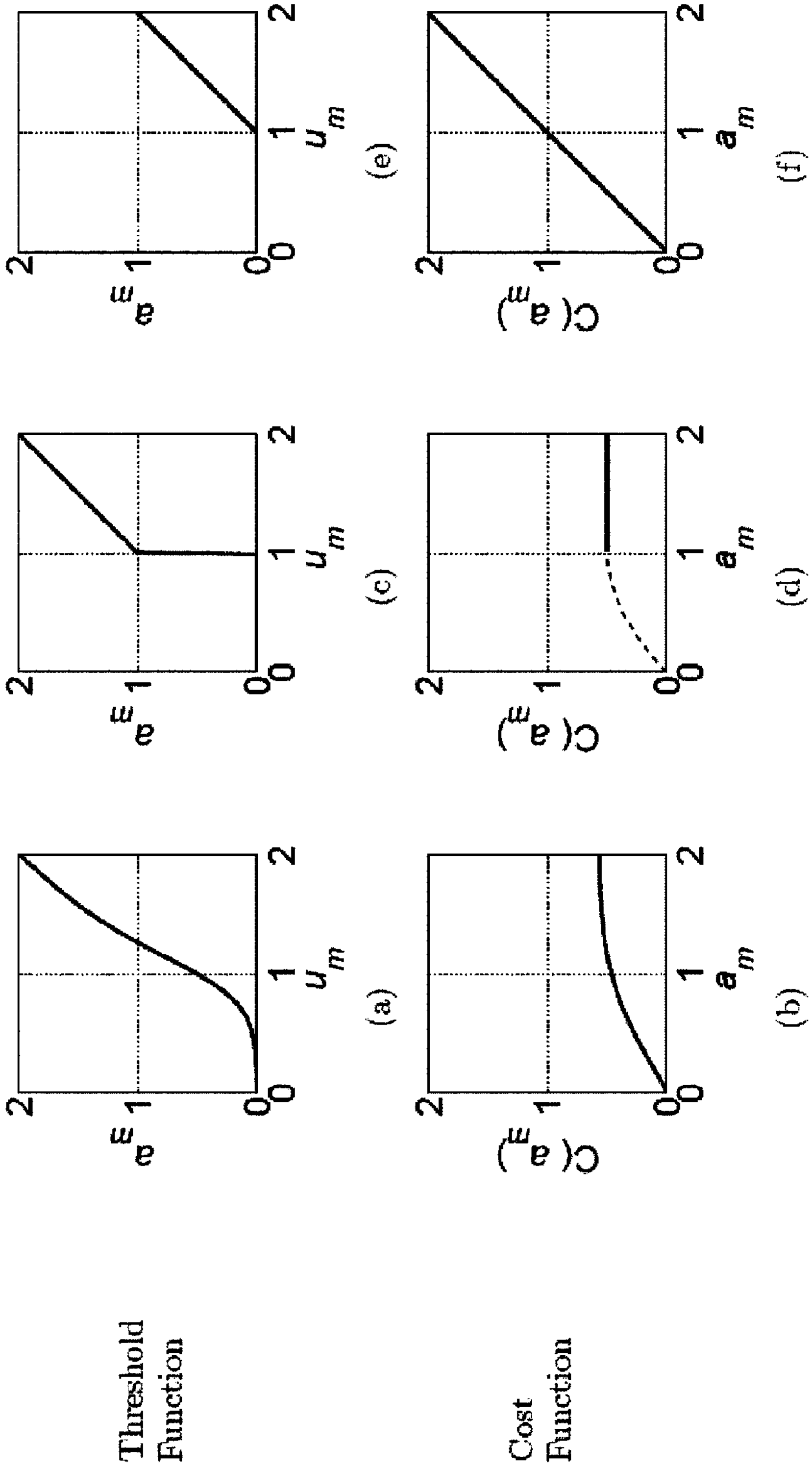
FIGS. 2(*a*)-(*f*) illustrate the relationship between the threshold function $T_{(\alpha, \gamma, \lambda)}(\bullet)$ and the sparsity cost function $C(\bullet)$. Only the positive half of the symmetric threshold and cost functions are plotted.

We focus specifically on the cost functions associated with thresholding activation functions. Thresholding functions limit the lateral inhibition by allowing only "strong" units to suppress other units and forcing most coefficients to be identically zero. For our purposes, thresholding functions $T_\lambda(\bullet)$ have two distinct behaviors over their range: they are essentially linear with unit slope above threshold λ, and essentially zero below threshold. Among many reasonable choices for thresholding functions, we use a smooth sigmoidal function $$T_{(\alpha\zeta\gamma,\lambda)}(u_m) = \frac{u_m - \alpha\lambda}{1 + e^{-\gamma(u_m-\lambda)}}, \tag{8}$$

where γ is a parameter controlling the speed of the threshold transition and $\alpha \in [0,1]$ indicates what fraction of an additive adjustment is made for values above threshold. An example sigmoidal thresholding function is shown in FIG. 2*a*. We are particularly interested in the limit of this thresholding function as $\gamma \to \infty$, a piecewise linear function we denote as the ideal thresholding function. In the signal processing literature, $T_{(0,\infty,\lambda)}(\bullet)=\lim_{\gamma\to\infty} T_{(0,\gamma,\lambda)}(\bullet)$ is known as a "hard" thresholding function and $T_{(1,\infty,\lambda)}(\bullet)=\lim_{\gamma\to\infty} T_{(1,\gamma,\lambda)}(\bullet)$ is known as a "soft" thresholding function.

Combining (7) and (8), we can integrate numerically to determine the cost function corresponding to the $T_{(\alpha,\gamma,\lambda)}(\bullet)$ shown in FIG. 2*b*. For the ideal threshold functions we derive a corresponding ideal cost function, $$C_{(\alpha,\infty,\lambda)}(a_m) = \frac{(1-\alpha)^2\lambda}{2} + \alpha|\alpha_m|. \tag{9}$$

Note that unless α=1 the ideal cost function has a gap because active coefficients cannot take all possible values, $|a_m| \notin [0,(1-\alpha)\lambda]$ (i.e., the ideal thresholding function is not technically invertible).

Figure 3A:
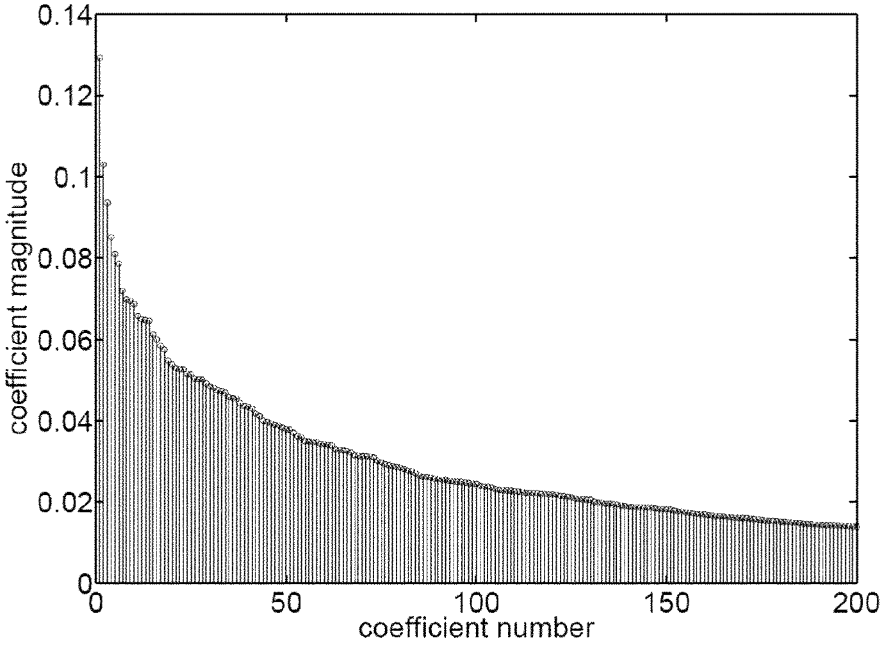
FIGS. 3(*a*) and (*b*) respectively illustrate the top 200 coefficients from a BPDN solver sorted by magnitude and the same coefficients, sorted according to the magnitude ordering of the SLCA coefficients. While there is a gross decreasing trend noticeable, the largest SLCA coefficients are not in the same locations as the largest BPDN coefficients. While the solutions have equivalent energy functions, the two sets of coefficients differ significantly.
Figure 3B:
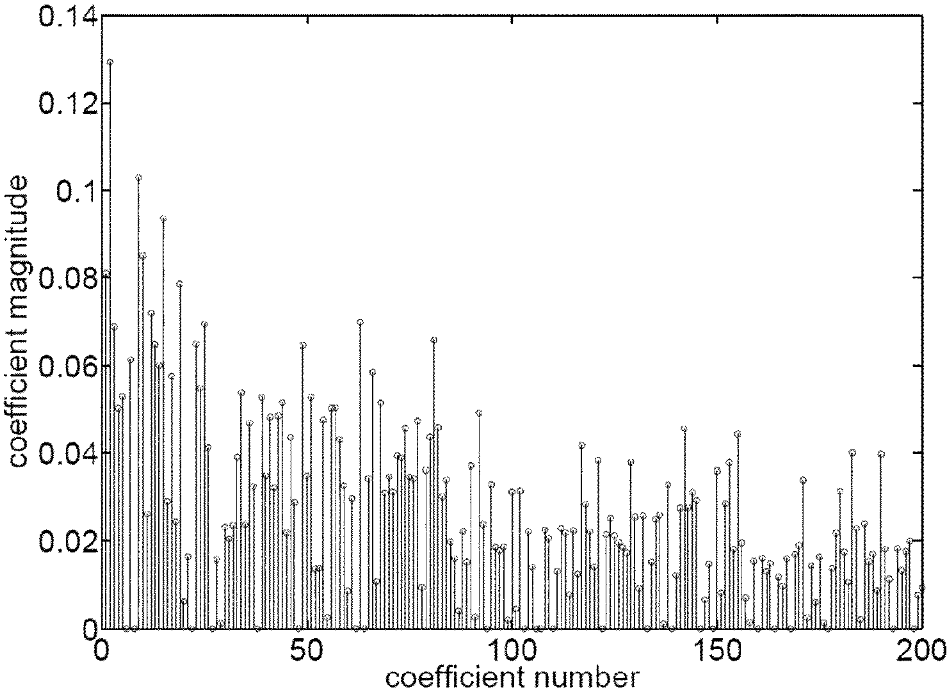
Figure 4A:
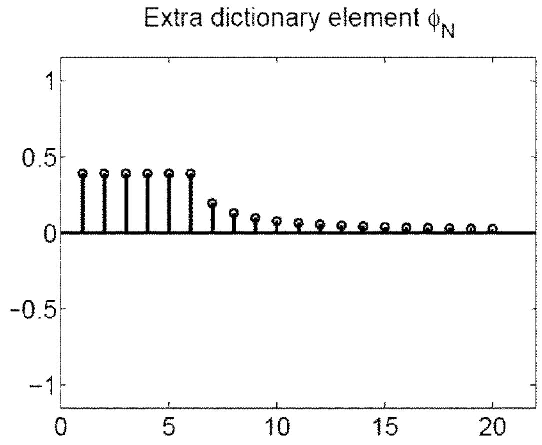
FIG. 4(*a*) illustrates an example of a dictionary having one "extra" element that comprises decaying combinations of all other dictionary elements.
Figure 4B:
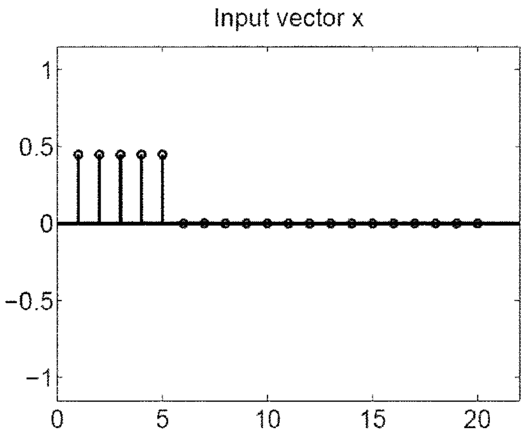
Figure 4C:
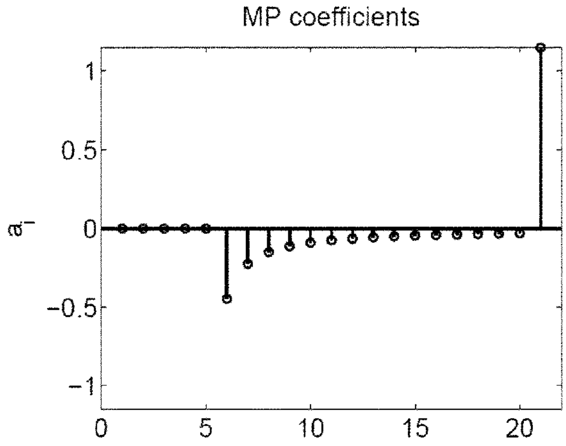
Figure 4D:
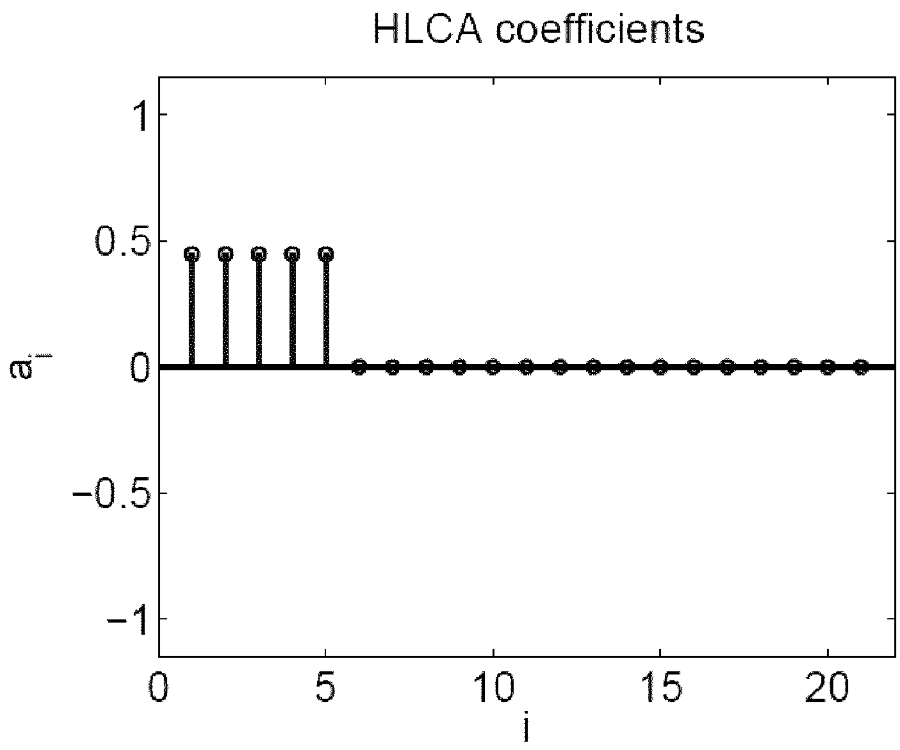
Figure 4E:
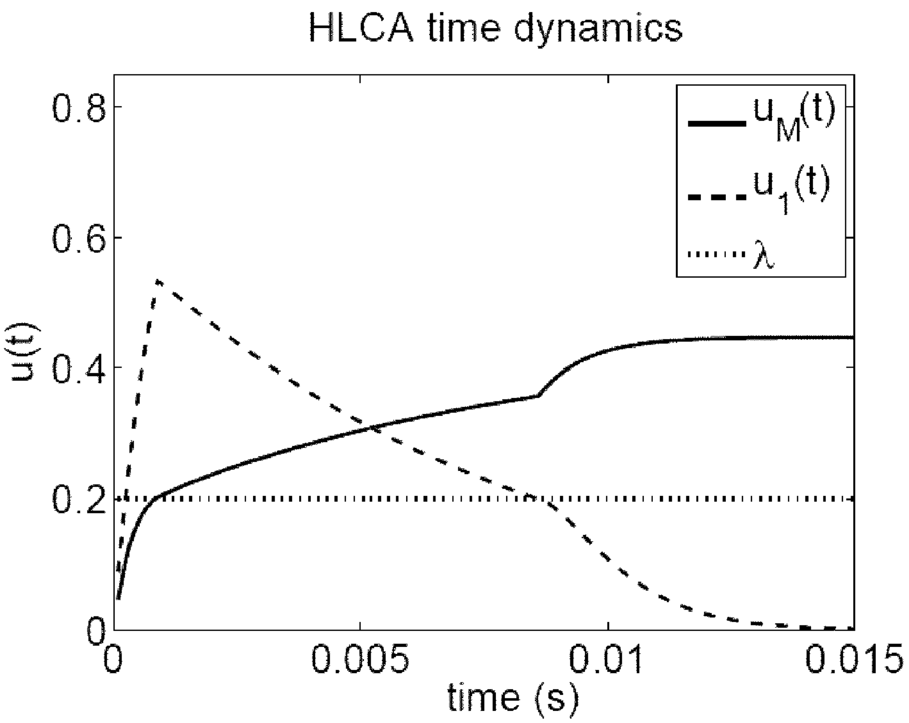

As shown above, a LCA can optimize a variety of different sparsity measures depending on the choice of thresholding function. One special case is the soft thresholding function, corresponding to α=1 and shown graphically in FIGS. 2*e* and 2*f*. The soft-thresholding locally competitive algorithm (SLCA) applies the $l^1$ norm as a cost function on the active coefficients, $C_{(1,\infty,\lambda)}(a_m)=|a_m|$. Thus, the SLCA is simply another solution method for the general BPDN problem described above. Despite minimizing the same convex energy function, SLCA and BPDN solvers will find different sets of coefficients, as illustrated in FIG. 3. The connection between soft-thresholding and BPDN is well-known in the case of orthonormal dictionaries (Chen et al., 2001), and recent results have given some justification for using soft-thresholding in over complete dictionaries. The SLCA provides another formal connection between the soft-thresholding function and the $l^1$ cost function.

Though BPDN uses the $l^1$-norm as its sparsity penalty, we often expect many of the resulting coefficients to be identically zero (especially when M>N). However, most numerical methods (including direct gradient descent and interior point solvers) will drive coefficients toward zero but will never make them identically zero. While an ad hoc threshold could be applied to the results of a BPDN solver, the SLCA has the advantage of incorporating a natural thresholding function that keeps coefficients identically zero during the computation unless they become active. In other words, while BPDN solvers often start with many non-zero coefficients and try to force coefficients down, the SLCA starts with all coefficients equal to zero and only lets a few grow up. This advantage is especially important for systems that must expend energy for non-zero values throughout the entire computation.

Another important special case is the hard thresholding function, corresponding to α=0 and shown graphically in FIGS. 2*c* and 2*d*. Using the relationship in (7), we see that this hard-thresholding locally competitive algorithm (HLCA) applies an $l^0$-like cost function by using a constant penalty regardless of magnitude, $$C_{(0,\infty,\lambda)}(a_m) = \frac{\lambda}{2} I(|a_m|)\lambda),$$

where $I(\bullet)$ is the indicator function evaluating to 1 if the argument is true and 0 if the argument is false. As with the SLCA, the HLCA also has connections to known sparse approximation principles. If node m is fully charged, the inhibition signal it sends to other nodes would be exactly the same as the update step when the $m^{th}$ node is chosen in the MP algorithm. However, due to the continuous competition between nodes before they are fully charged, the HLCA is not equivalent to MP in general.

As a demonstration of the power of competitive algorithms over greedy algorithms, consider a canonical example used to illustrate the shortcomings of greedy algorithms. For this example, specify a positive integer K<N and construct a dictionary D with M=N+1 elements to have the following form:

$$\phi_m = \begin{cases} e_m & \text{if } m \le N \\ \sum_{n=1}^{K} \kappa e_n + \sum_{n=K+1}^{N} (\kappa/(n-K))e_n & \text{if } m = N+1, \end{cases}$$

where $e_m$ is the canonical basis element (i.e., it contains a single 1 in the $m^{th}$ location) and k is a constant to make the vectors have unit norm. In words, the dictionary includes the canonical basis along with one "extra" element that is a decaying combination of all other elements (illustrated in FIG. 4, with N=20 and K=5). The input signal is sparsely represented in the first K dictionary elements, $$s = \sum_{m=1}^{K} \frac{1}{\sqrt{K}} e_m.$$

The first MP iteration chooses $\phi_M$, introducing a residual with decaying terms. Even though s has an exact representation in K elements, MP iterates forever trying to atone for this bad initial choice. In contrast, the HLCA initially activates the $M^{th}$ node but uses the collective inhibition from nodes 1, . . . , K to suppress this node and calculate the optimal set of coefficients. While this pathological example is unlikely to exactly occur in natural signals, it is often used as a criticism of greedy methods to demonstrate their shortsightedness. We mention it here to demonstrate the flexibility of LCAs and their differences from pure greedy algorithms.

To be a reasonable for physical implementation, LCAs must exhibit several critical properties: the dynamic systems must remain stable under normal operating conditions, the system must produce sparse coefficients that represent the stimulus with low error, and coefficient sequences must exhibit regularity in response to time-varying inputs. We show that LCAs exhibit good characteristics in each of these three areas. We focus our analysis on the HLCA both because it yields the most interesting results and because it is notationally the cleanest to discuss. In general, the analysis principles we use will apply to all LCAs through straightforward (through perhaps laborious) extensions.

Any proposed physical system must remain well-behaved under normal conditions. While linear systems theory has an intuitive notion of stability that is easily testable, no such unifying concept of stability exists for non-linear systems. Instead, non-linear systems are characterized in a variety of ways, including their behavior near an equilibrium point u* where f(u*)=0 and their input-output relationship.

The various stability analyses below depend on common criteria. Define $M_{u(t)} \subseteq [1, \ldots, M]$ as the set of nodes that are above threshold in the internal state vector u(t), $M_{u(t)} = \{m: |u_m(t)| \geqq \lambda\}$. We say that the LCA meets the stability criteria if for all time t the set of active vectors $\{\phi_m\}_{m \in M_{u(t)}}$ is linearly independent. It makes some intuitive sense that this condition is important to an LCA: if a collection of linearly dependent nodes are active simultaneously, the nodes could have growing coefficients but no net effect on the reconstruction.

The stability criteria are likely to be met under normal operating conditions for two reasons. First, small subsets of dictionary elements are unlikely to be linearly dependent unless the dictionary is designed with this property. Second, sparse coding systems are actively trying to select dictionary subsets so that they can use many fewer coefficients then the dimension of the signal space, $|M_{u(t)}| << N << M$. While the LCA lateral inhibition signals discourage linear dependent sets from activating, the stability criteria could be violated when a collection of nodes becomes active too quickly, before inhibition can take effect. In practice, this situation could occur when the threshold is too low compared to the system time constant.

In a LCA presented with a static input, we look to the steady-state response (where $\dot{u}(t)=0$) to determine the coefficients. The character of the equilibrium points u*(f(u*)=0) and the system's behavior in a neighborhood around an equilibrium point provides one way to ensure that a system is well behaved. Consider the ball around an equilibrium point $B_\epsilon(u^*) = \{u: \|u - u^*\| \langle \epsilon\}$. Nonlinear system's analysis typically asks an intuitive question: if the system is perturbed within this ball, does it then run away, stay where it is, or get attracted back? Specifically, a system is said to be locally asymptotically stable at an equilibrium point u* if one can specify an $\epsilon > 0$ such that $$u(0) \in B_\epsilon(u^*) \Rightarrow \lim_{t \to \infty} u(t) = u^*.$$

Previous research has used the tools of Lyapunov functions to study a Hopfield network similar to the LCA architecture. However, all of these analyses make assumptions that do not encompass the ideal thresholding functions used in the LCAs (e.g., they are continuously differentiable and/or monotone increasing). As the stability criteria is met, the HLCA:

has a finite number of equilibrium points;

has equilibrium points that are almost certainly isolated (no two equilibrium points are arbitrarily close together); and is almost certainly locally asymptotically stable for every equilibrium point.

The conditions that hold "almost certainly" are true as long as none of the equilibria have components identically equal to the threshold, ($u^*_m \neq \lambda, \forall m$), which holds with overwhelming probability. With a finite number of isolated equilibria, we can be confident that the HLCA steady-state response is a distinct set of coefficients representing the stimulus. Asymptotic stability also implies a notion of robustness, guaranteeing that the system will remain well-behaved even under perturbations.

In physical systems it is important that the energy of both internal and external signals remain bounded for bounded inputs. One intuitive approach to ensuring output stability is to examine the energy function E. For non-decreasing threshold functions, the energy function is non-increasing $$\left(\frac{d}{dt}E(t) \leq 0\right)$$

for fixed inputs. While this is encouraging, it does not guarantee input-output stability. To appreciate this effect, note that the HLCA cost function is constant for nodes above threshold—nothing explicitly keeps a node from growing without bound once it is active.

While there is no universal input-output stability test for general non-linear systems, we observe that the LCA system equation is linear and fixed until a unit crosses threshold. A branch of control theory specifically addresses these switched systems. Results from this field indicate that input-output stability can be guaranteed if the individual linear subsystems are stable, and the system doesn't switch "too fast" between these subsystems. The HLCA linear subsystems are individually stable if and only if the stability criteria are met. Therefore, the HLCA is input-output stable as long as nodes are limited in how fast they can change states. The infinitely fast switching condition is avoided in practice either by the physical principles of the system implementation or through an explicit hysteresis in the thresholding function.

Figure 5:
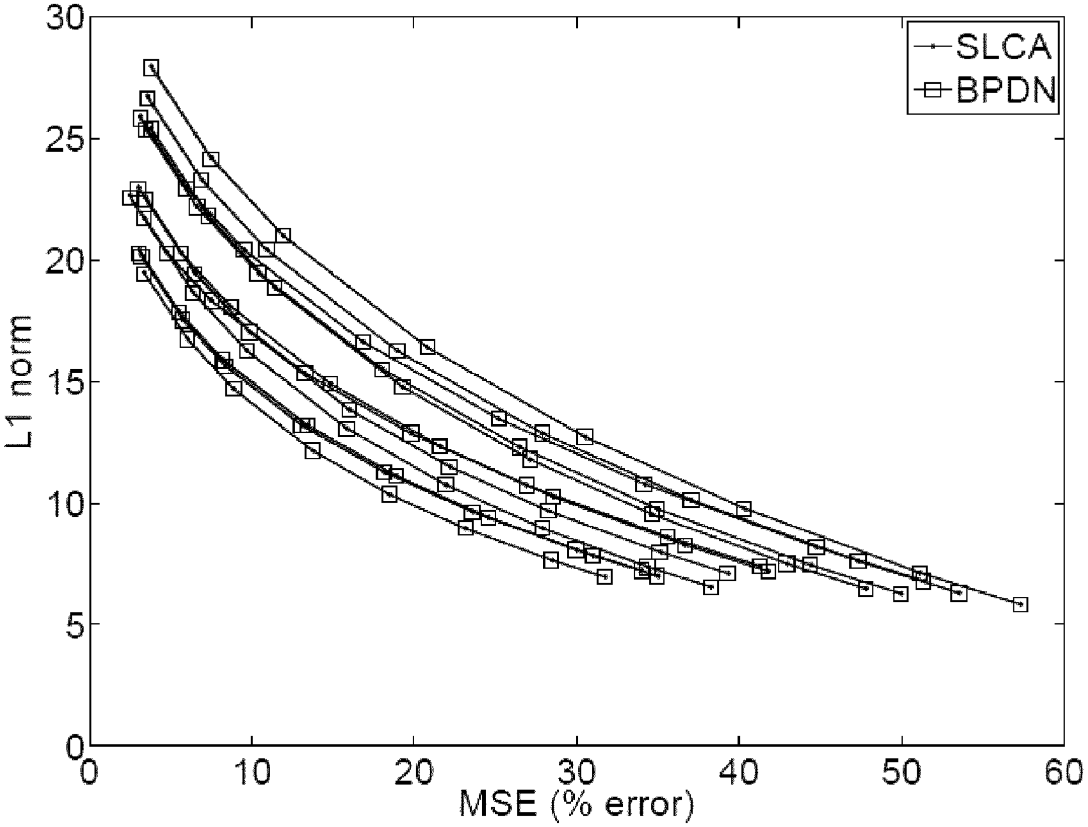
FIG. 5 illustrates SLCA and BPDN coefficients for a series of standard test images. Each line on the plot indicates the tradeoff between MSE and $l^1$ coefficient norm as λ is varied. The results for SLCA and BPDN overlap exactly, illustrating that the systems are finding equivalent minima of the energy function.
Figure 6A:
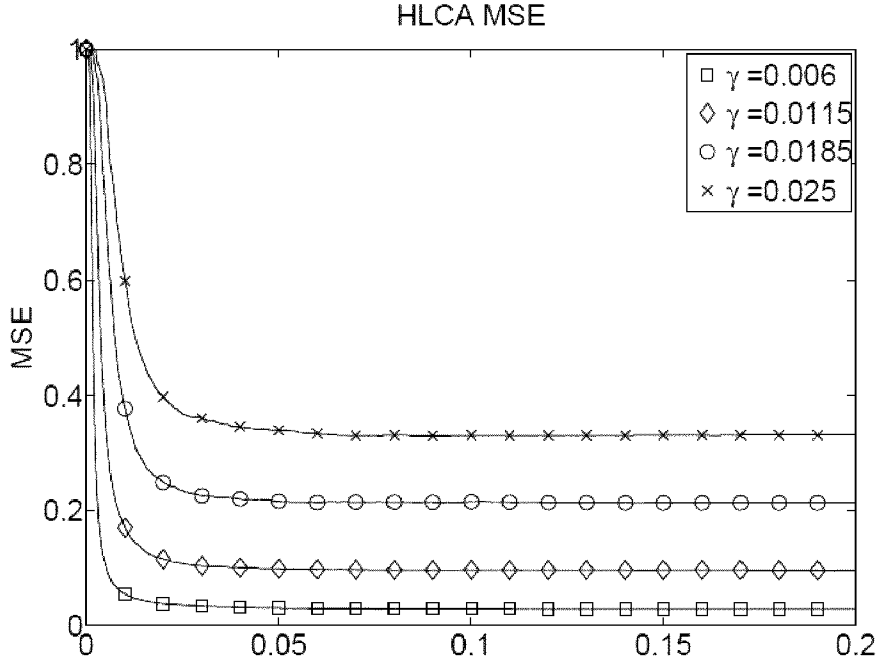
FIGS. 6(*a*)-(*d*) illustrates the time response of the HLCA and SLCA (τ=10 ms) for a single fixed image patch.
Figure 6B:
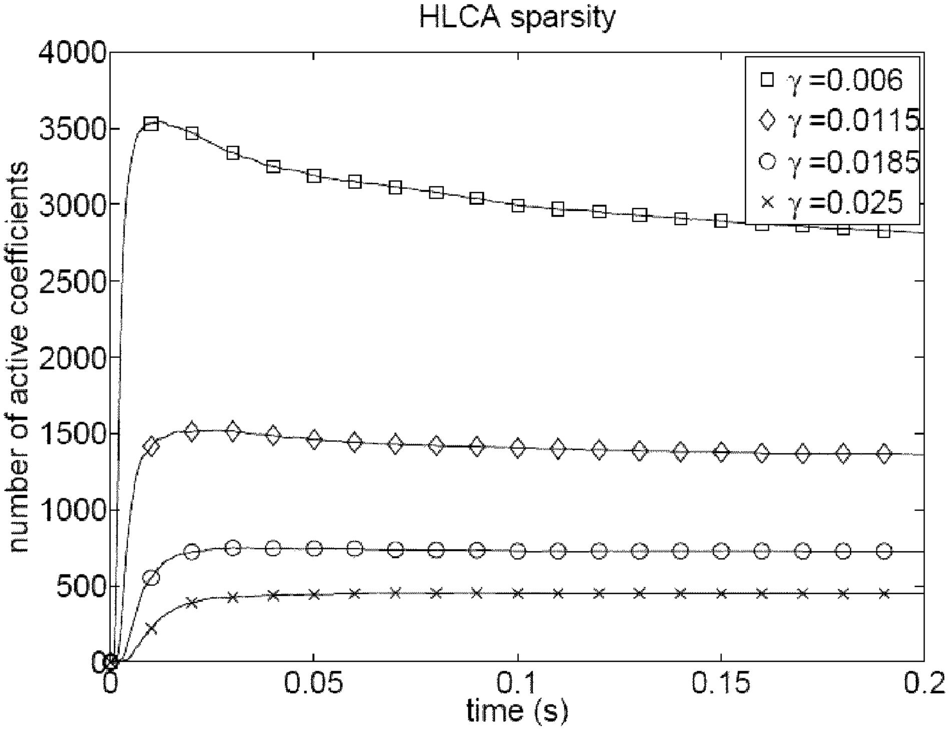
Figure 6C:
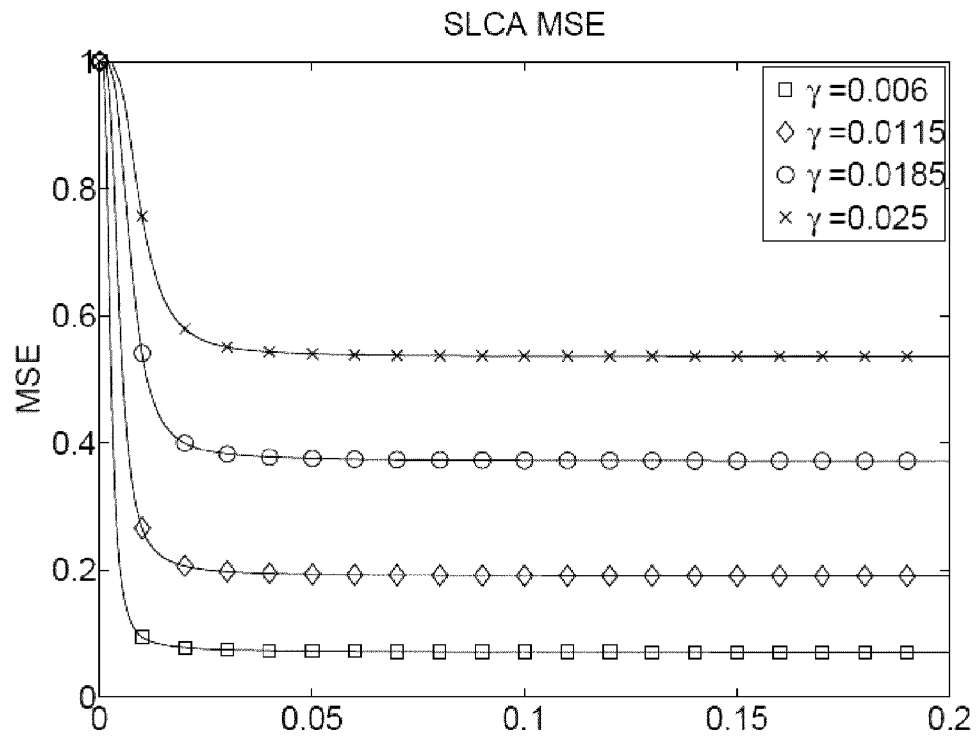
Figure 6D:
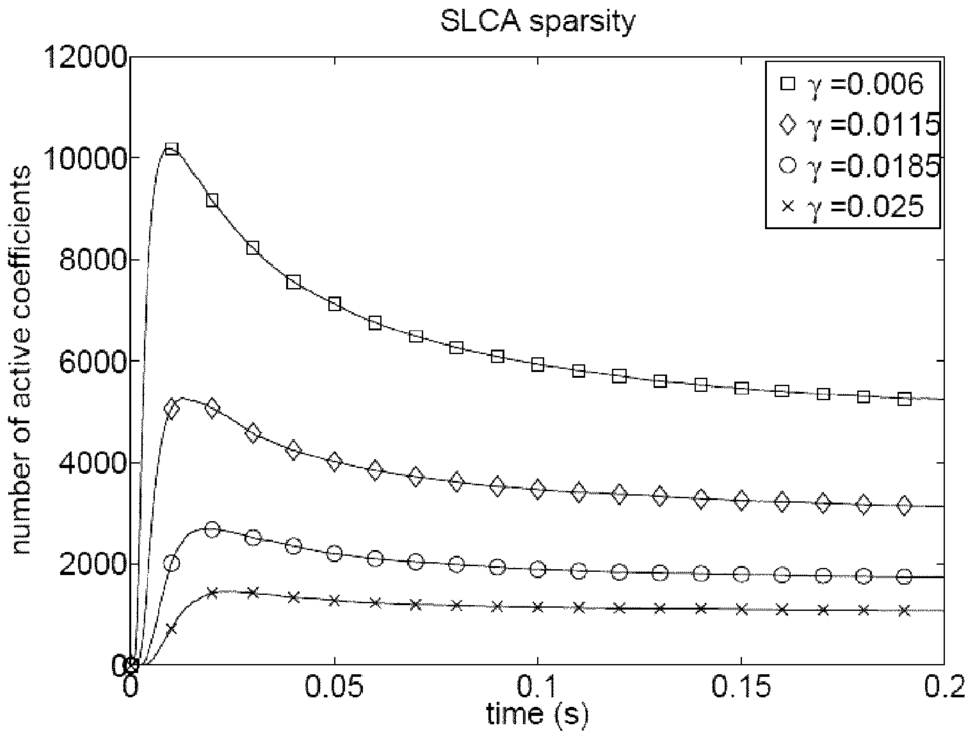

Viewing the sparse approximation problem through the lens of rate-distortion theory, the most powerful algorithm produces the lowest reconstruction MSE for a given sparsity. When the sparsity measure is the $l^1$ norm, the problem is convex and the SLCA produces solutions with equivalent $l^1$-sparsity to interior point BPDN solvers (demonstrated in FIG. 5). Despite the analytic appeal of the $l^1$ norm as a sparsity measure, many systems concerned with energy minimization (including neural systems) likely have an interest in minimizing the $l^0$ norm of the coefficients. The HLCA is appealing because of its $l^0$-like sparsity penalty, but this objective function is not convex and the HLCA may find a local minimum. We will show that while HLCA cannot guarantee the $L^0$ sparsest solution, it produces coefficients that demonstrate comparable sparsity to MP for natural images. Insight about the HLCA reconstruction fidelity comes from rewriting the LCA system equation $$\dot{u}(t) = \frac{1}{\tau}[\Phi^t(s(t) - \hat{s}(t)) - u(t) + T_{(\alpha,\infty,\lambda)}(u(t))]. \tag{10}$$

For a constant input, HLCA equilibrium points ($\dot{u}(t)=0$) occur when the residual error is orthogonal to active nodes and balanced with the internal state variables of inactive nodes.

$$\langle\phi_m, s(t) - \hat{s}(t)\rangle = \begin{cases} u_m(t) & \text{if } |u_m| \le \lambda \\ 0 & \text{if } |u_m| > \lambda \end{cases}.$$

Therefore, when HLCA converges the coefficients will perfectly reconstruct the component of the input signal that projects onto the subspace spanned by the final set of active nodes. Using standard results from frame theory (Christensen, 2002), we can bound the HLCA reconstruction MSE in terms of the set of inactive nodes $$\|s(t) - \hat{s}(t)\|^2 \le \frac{1}{\eta_{\min}} \sum_{m \notin \mathcal{M}_{u(t)}} |\langle\phi_m, s(t) - \hat{s}(t)\rangle|^2 \le \frac{(M - |\mathcal{M}_{u(t)}|)\lambda^2}{\eta_{\min}}.$$

where $\eta_{min}$ is the minimum eigenvalue of $\Phi\Phi^t$.

Though the HLCA is not guaranteed to find the globally optimal $l^0$ sparsest solution we must ensure that it does not produce unreasonably non-sparse solutions. While the system nonlinearity makes it impossible to analytically determine the LCA steady-state coefficients, it is possible to rule out some coefficients as not being possible. For example, let $M \subseteq [1, \ldots, M]$ be an arbitrary set of active coefficients. Using linear systems theory we can calculate the steady-state response assuming that M stays fixed. If $|\tilde{u}_m^M| < \lambda$ for any $m \in M$ or if $|\tilde{u}_m^M| > \lambda$ for any $m \in M$, then M cannot describe the set of active nodes in the steady-state response and we call it inconsistent. When the stability criteria are met, the following statement is true for the HLCA: If $s=\phi_m$, then any set of active coefficients M with $m \in M$ and $|M|>1$ is inconsistent. In other words, the HLCA may use the $m^{th}$ node or a collection of other nodes to represent s, but it cannot use a combination of both. This result extends intuitively beyond one-sparse signals: each component in an optimal decomposition is represented by either the optimal node or another collection of nodes, but not both. While not necessarily finding the optimal representation, the system does not needlessly employ both the optimal and extraneous nodes.

It can also be verified numerically that the LCAs achieve a combination of error and sparsity comparable with known methods. For example, we employed a dictionary consisting of the bandpass band of a steerable pyramid with one level and four orientation bands (i.e., the dictionary is approximately four times overcomplete). Image patches (32×32) were selected at random from a standard set of test images. The selected image patches were decomposed using the steerable pyramid and reconstructed using just the bandpass band. The bandpass image patches were also normalized to have unit energy. Each image patch was used as the fixed input to the LCA system equation (5) using either a soft or hard thresholding function (with variable threshold values) and with a biologically plausible membrane time constant of $\tau=10$ ms. We simulated the system using a simple Euler's method approach (i.e., first order finite difference approximation) with a time step of 1 ms.

Figure 7A:
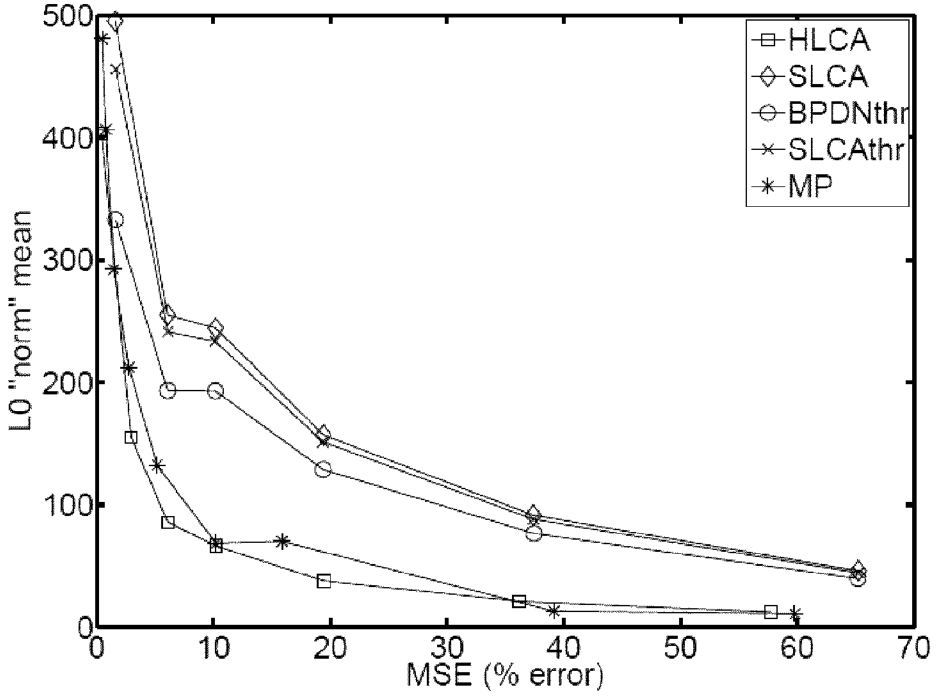
FIG. 7 illustrates the mean tradeoff between MSE and $l^0$-sparsity for normalized (32×32) patches from a standard set of test images. For a given MSE range, the mean (a) and standard deviation (b) of the $l^0$ sparsity are plotted.
Figure 7B:
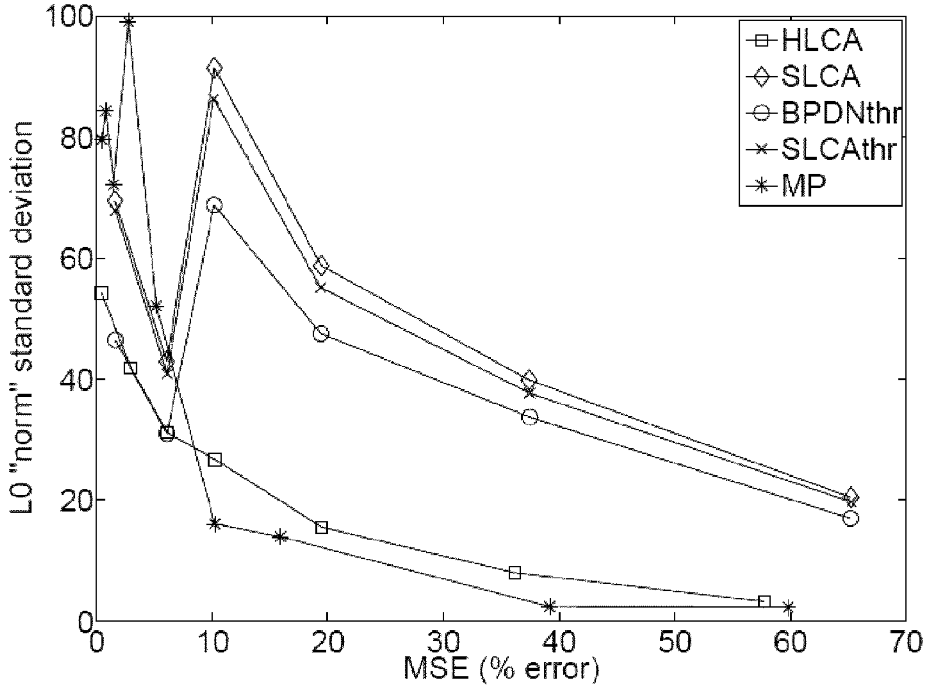

FIG. 6 shows the time evolution of the reconstruction MSE and $l^0$ sparsity for SLCA and HLCA responding to an individual image, and FIG. 7 shows the mean steady-state tradeoff between $l^0$ sparsity and MSE. For comparison, we also plotted the results obtained from using MP, a standard BPDN interior point solver followed by thresholding to enforce $l^0$ sparsity (denoted "BPDNthr") and SLCA with the same threshold applied (denoted "SLCAthr"). Most importantly, note that the HLCA and MP are almost identical in their sparsity-MSE tradeoff. Though the connections between the HLCA and MP were pointed out above, these are very different systems and there is no reason to expect them to produce the same coefficients. Additionally, note that the SLCA is producing coefficients that are nearly as $l^0$-sparse as what we can be achieved by thresholding the results of a BPDN solver even though the SLCA keeps most coefficients zero throughout the calculation.

Systems sensing the natural world are faced with constantly changing stimuli due to both external movement and internal factors (e.g., sensor movement, etc.). As discussed above, sparse codes with temporal variations that also reflect the smooth nature of the changing signal would be easier for higher level systems to understand and interpret. However, approximation methods that only optimize sparsity at each time step (especially greedy algorithms) can produce "brittle" representations that change dramatically with relatively small stimulus changes. In contrast, LCAs naturally produce smoothly changing outputs in response to smoothly changing time-varying inputs. Assuming that the system time constant $\tau$ is faster than the temporal changes in the stimulus, the LCA will evolve to capture the stimulus change and converge to a new sparse representation. While local minima in an energy function are typically problematic, the LCAs can use these local minima to find coefficients that are "close" to their previous coefficients even if they are not optimally sparse. While permitting suboptimal coefficient sparsity, this property allows the LCA to exhibit inertia that smoothes the coefficient sequences. The inertia property exhibited in LCAs can be seen by focusing on a single node in the system equation (10):

$$\dot{u}_m(t) = \frac{1}{\tau}\begin{cases} \langle\phi_m, (s(t) - \hat{s}(t))\rangle - u_m(t) & \text{when } |u_m(t)| < \lambda \\ \langle\phi_m, (s(t) - \hat{s}(t))\rangle - \alpha\lambda & \text{when } |u_m(t)| \ge \lambda. \end{cases}$$

A new residual signal drives the coefficient higher but suffers an additive penalty. Inactive coefficients suffer an increasing penalty as they get closer to threshold while active coefficients only suffer a constant penalty $\alpha\lambda$ that can be very small (e.g., the HLCA has $\alpha\lambda=0$). This property induces a "king of the hill" effect: when a new residual appears, active nodes move virtually unimpeded to represent it while inactive nodes are penalized until they reach threshold. This inertia encourages inactive nodes to remain inactive unless the active nodes cannot adequately represent the new input.

Figure 8:
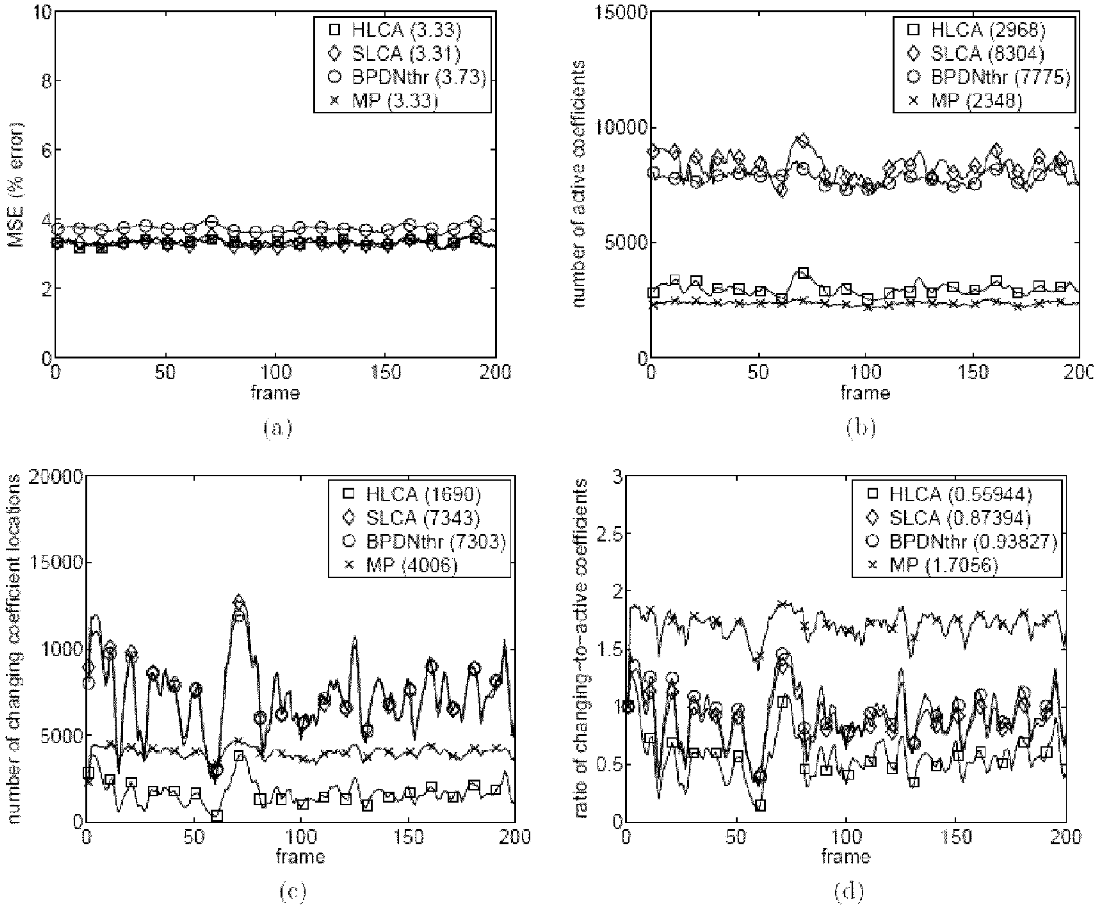
FIGS. 8(*a*)-(*d*) shows the HLCA and SLCA systems simulated on 200 frames of the "foreman" test video sequence. For comparison, MP coefficients and thresholded BPDN coefficients are also shown. Average values for each system are notated in the legend.

To illustrate this inertia, we applied the LCAs to a sequence of 144×144 pixel, bandpass filtered, normalized frames from the standard "foreman" test video sequence. The LCA input is switched to the next video frame every (simulated) 1/30 seconds. The results are shown in FIG. 8, along with comparisons to MP and BPDN applied independently on each frame. The changing coefficient locations are nodes that either became active or inactive at each frame. Mathematically, the number of changing coefficients at frame n is: $|M_{u(n-1)} \oplus M_{u(n)}|$, where $\oplus$ is the "exclusive OR" operator and u(n) are the internal state variables at the end of the simulation for frame n.

This simulation highlights that the HLCA uses approximately the same number of active coefficients as MP but chooses coefficients that more efficiently represent the video sequence. The HLCA is significantly more likely to re-use active coefficient locations from the previous frame without making significant sacrifices in the sparsity of the solution. This difference is highlighted when looking at the ratio of the number of changing coefficients to the number of active coefficients, $|M_{u(n-1)} \oplus M_{u(n)}|/|M_{u(n)}|$. MP has a ratio of 1.7, meaning that MP is finding almost an entirely new set of active coefficient locations for each frame. The HLCA has a ratio of 0.5, meaning that it is changing approximately 25% of its coefficient locations at each frame. SLCA and BPDNthr have approximately the same performance, with regularity falling between HLCA and MP. Though the two systems can calculate different coefficients, the convexity of the energy function appears to be limiting the coefficient choices enough so that SLCA cannot smooth the coefficient time series substantially more than BPDNthr.

The simulation results indicate that the HLCA is producing time series coefficients that are much more regular than MP. This regularity is visualized in FIG. 10 by looking at the time-series of example HLCA and MP coefficients. Note that though the two coding schemes produce roughly the same number of non-zero entries, the HLCA does much better than MP at clustering the values into consecutive runs of positive or negative values. This type of smoothness better reflects the regularity in the natural video sequence input. We can quantify this increased regularity by examining the Markov state transitions. Specifically, each coefficient time-series is Markov chain with three possible states at frame n:

$$\sigma_m(n) = \begin{cases} - & \text{if } u_m(n) < -\lambda \\ 0 & \text{if } -\lambda \le u_m(n) \le \lambda \\ + & \text{if } u_m(n) > \lambda \end{cases}$$

Figure 9A:
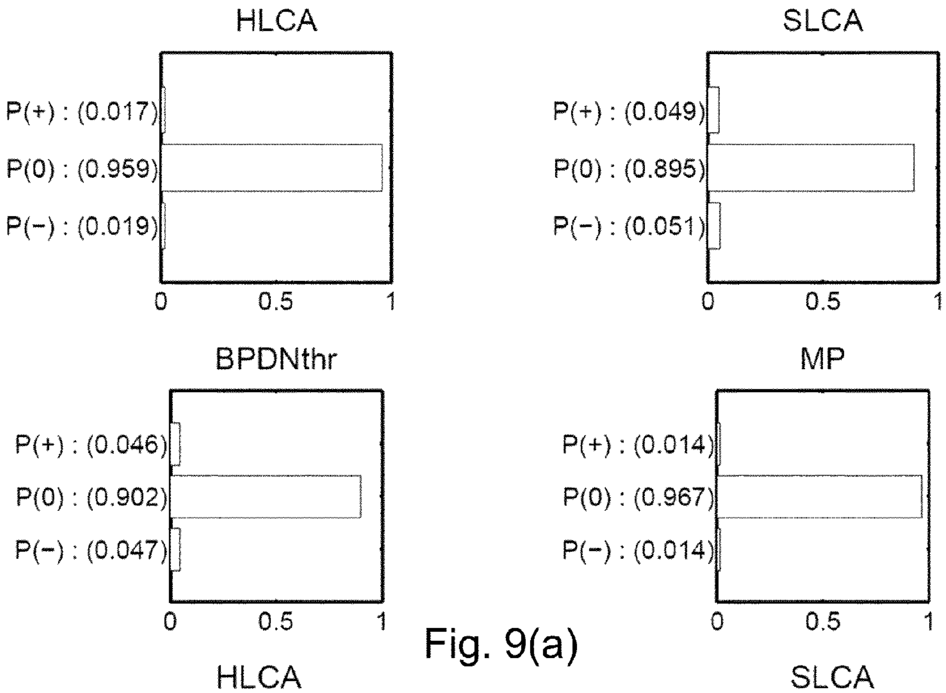
FIG. 9(*a*) shows the marginal probabilities denoting the fraction of the time coefficients spent in the three states: negative, zero and positive (–, 0, and +).
Figure 9B:
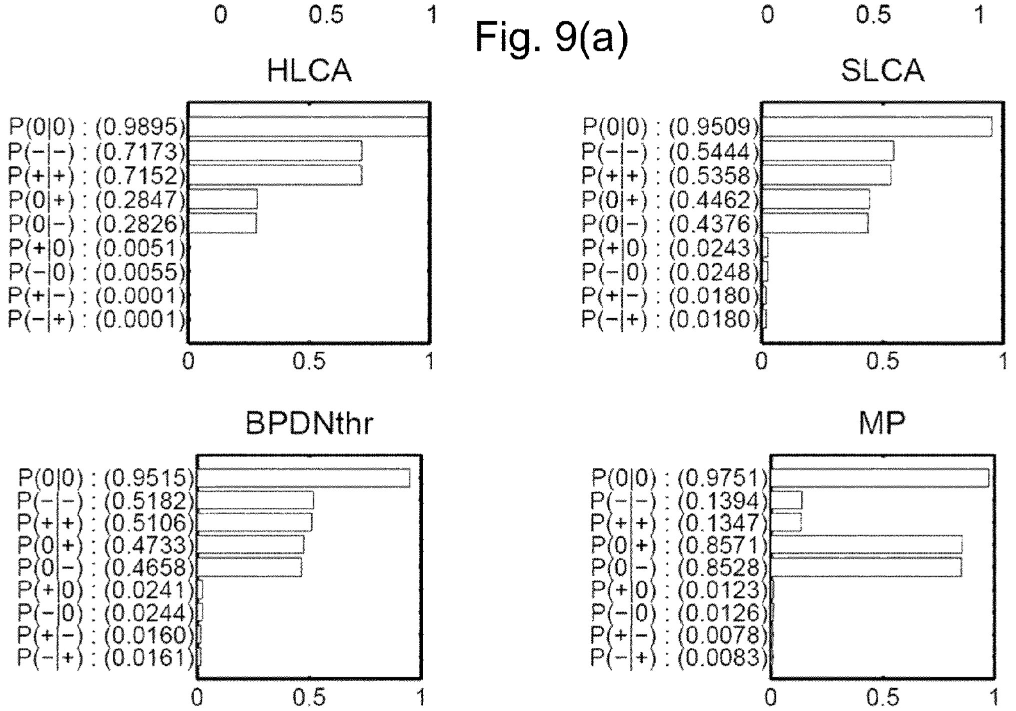
Figure 10A:
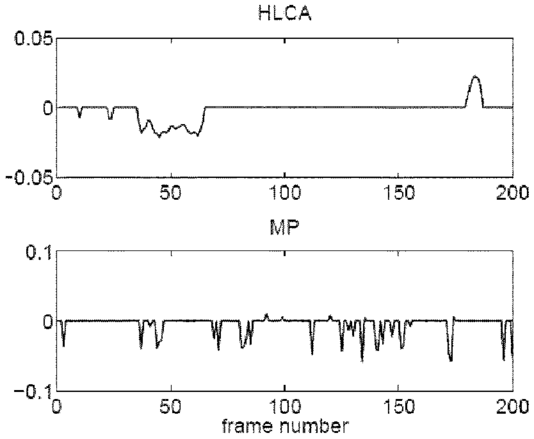
FIG. 10(*a*) illustrates an example time-series coefficient for the HLCA and MP (top and bottom, respectively) encodings for the test video sequence. HLCA clusters non-zero entries together into longer runs while MP switches more often between states.
Figure 10B:
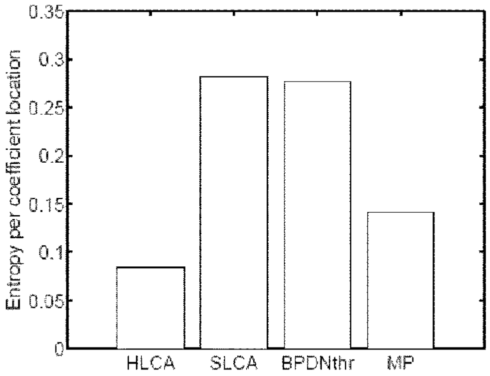
Figure 10C:
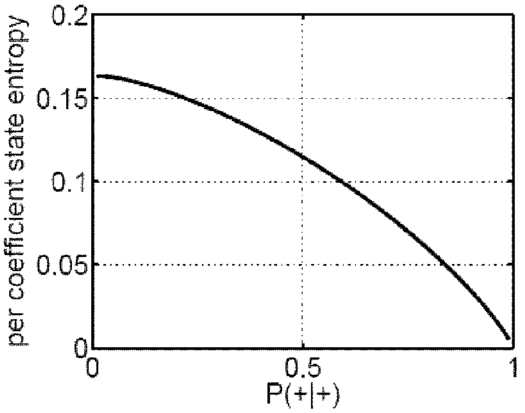

FIG. 9 shows the marginal probabilities P(•) of the states and the conditional probabilities P(•|•) of moving to a state given the previous state. The HLCA and MP are equally likely to have non-zero states, but the HLCA is over five times more likely than MP to have a positive coefficient stay positive (P (+|+)). Also, though the absolute probabilities are small, MP is roughly two orders of magnitude more likely to have a coefficient swing from positive to negative (P(−|+)) and vice-versa (P(−|+)). To quantify the regularity of the active coefficient locations we calculate the entropy of the coefficient states at frame n conditioned on the coefficient states at frame (n−1):

$$\begin{aligned} H(\sigma_m(n) \mid \sigma_m(n-1)) = & -P(+)[P(-\mid +) + P(0\mid +) + P(+\mid +)] - \\ & P(0)[P(-\mid 0) + P(0\mid 0) + P(+\mid 0)] - \\ & P(-)[P(-\mid -) + P(0\mid -) + P(+\mid -)], \end{aligned} \tag{11}$$

plotted in FIG. 10. This conditional entropy indicates how much uncertainty there is about the status of the current coefficients given the coefficients from the previous frame. Note that the conditional entropy for MP is almost double the entropy for the HLCA, while SLCA is again similar to BPDNthr. The principle contributing factor to the conditional entropy appears to be the probability a non-zero node remains in the same state (i.e., P(+|+) and P(−|−)). To illustrate, FIG. 10 shows the change in conditional entropy is almost linear with varying P(+|+) (assuming P(−|−)=P(+|+) and all other transition probabilities are kept fixed).

The substantial decrease in the conditional entropy for the HLCA compared to MP quantifies the increased regularity in time-series coefficients due to the inertial properties of the LCAs. The HLCA in particular encourages coefficients to maintain their present state (i.e., active or inactive) if it is possible Sparse approximation is an important paradigm in modern sensing and signal processing, though mechanisms to calculate these codes using parallel analog computational elements instead of digital computers have remained unknown. In the present invention, a locally competitive algorithm that solves a series of sparse approximation problems (including BPDN as a special case). These LCAs can be implemented using a parallel network of simple elements that match well with parallel analog computational architectures, including analog circuits and sensory cortical areas such as V1. Though these LCA systems are non-linear, we have shown that they are well-behaved under nominal operating conditions.

While the LCA systems (other than SLCA) are not generally guaranteed to find a globally optimal solution to their energy function, we have proven that the systems will be efficient in a meaningful sense. The SLCA system produces coefficients with sparsity levels comparable to BPDN solvers, but uses a natural physical implementation that is more energy efficient (i.e., it uses fewer non-zero inhibition signals between nodes). Perhaps most interestingly, the HLCA produces coefficients with almost identical sparsity as MP. This is significant because greedy methods such as MP are widely used in signal processing practice because of their efficiency, but HLCA offers a much more natural parallel implementation.

LCAs are particularly appropriate for time-varying data such as video sequences. The LCA ODE not only encourages sparsity but also introduces an inertia into the coefficient time-series that we have quantified using both raw counts of changing coefficient location and through the conditional entropy of the coefficient states. By allowing suboptimal sparsity in exchange for more regularity in the set of active coefficients, the LCAs produce smoother coefficient sequences that better reflect the structure of the time-varying stimulus. This property could prove valuable for higher levels of analysis that are trying to interpret the sensory scene from a set of sparse coefficients.

By using simple computational primitives, LCAs also have the benefit of being implementable in analog hardware. An imaging system using VLSI to implement LCAs as a data collection front end has the potential to be extremely fast and energy efficient. Instead of digitizing all of the sensed data and using digital hardware to run a compression algorithm, analog processing would compress the data into sparse coefficients before digitization. In this system, time and energy resources would only be spent digitizing coefficients that are a critical component in the signal representation.

Figure 11:
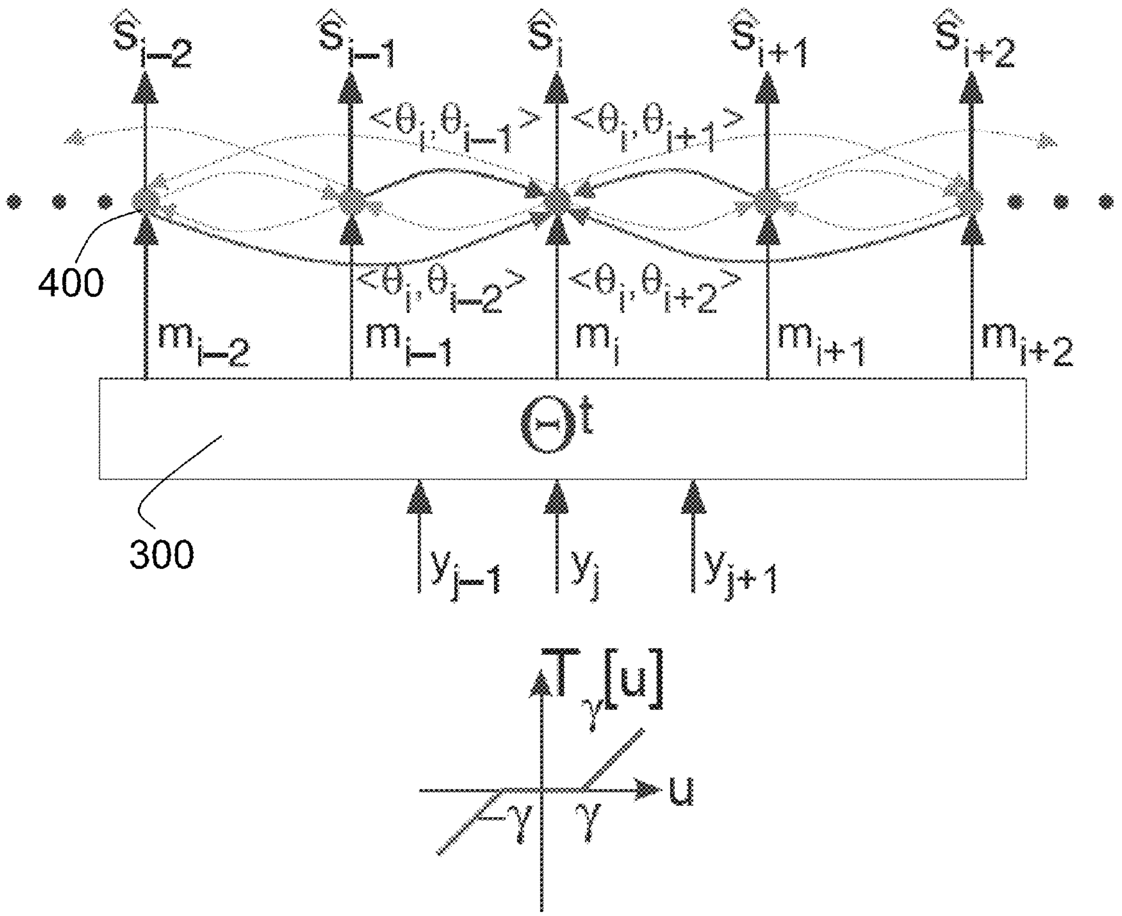
FIG. 11 is a diagram illustrating an LCA network for compressive sensing reconstruction and the nonlinear transformation applied to the state variable in each node in accordance with a preferred embodiment of the present invention. Originally, the LCA network found the best sparse approximation for the data vector x. In this case, the network input m equaled the data x directly and the interconnection strengths were given by $\langle \Psi_i, \Psi_l \rangle$. The LCA structure was modified as indicated so that it could solve the compressive sensing reconstruction problem.

Since the LCA network represents an analog way of finding sparse representations, it can be modified it for the compressive sensing reconstruction problem. As shown in FIG. 11, the compressed input signal is received by a projection system 300 which passes projection vectors to a plurality of nodes 400. Mathematically, the compressive sensing reconstruction problem amounts to a constrained optimization problem that can be recast with Lagrange multipliers into an unconstrained optimization problem.

$$\min_s(\|y-\Theta s\|_2^2+\lambda\|s\|_1)$$

The network's inputs must now equal $\Theta^t y$ and the inner products $\langle\theta_i, \theta_l\rangle$ determine the connection strengths between nodes i and l. When presented with the input, $m=\Theta^t y$, the LCA dynamically evolves to a steady state, producing as a result the set of sparse output coefficients. Unlike in the original applications of LCA, in compressively sensed image reconstruction the diagonal values of $\Theta^t\Theta$ are not all equal to 1, which is required to find the optimal solution without error. As a result, the following equation accommodates this problem.

$$\dot{u}(t)-\frac{1}{\tau}[m-Du-(\Theta^t\Theta-D)\hat{s}(t)] \tag{12}$$

Here, D is a diagonal matrix whose entries equal those of the diagonal of $\Theta^t\Theta$. Considering the above-threshold components and taking into account the thresholding function, we have shown that the steady-state solution becomes $$\hat{s}=s-\lambda D(\Theta^t\Theta)^{-1}1 \tag{13}$$

Thus, $\lambda D(\Theta^t\Theta)^{-1}$ represents error. Note that this bias could be removed because it is data-independent. However, calculating it would require inverting a large matrix. Our goal is to reduce and control it as much as possible by other means.

The state equation (12) was simulated in Matlab using the ode45 ordinary differential equation solver over a simulated time of 1.0 second with a time constant $\tau$ of 0.1. Test $\Theta$ matrices were derived from the product of a randomly generated $\Phi$ matrix (Gaussian independent and identically distributed random variables with zero mean) and a $\Psi$ basis matrix (2D Haar or Daubechies 4 wavelets). Test measurement vectors denoted by y, were initially calculated by randomly choosing a sparse set of numerical values of predetermined sparsity K and then computing $y=\Theta s$. The nonzero elements of s were in known positions and of known values, permitting the $\hat{s}$ (reconstructed) coefficients determined by the LCA network to be compared against the original s vector. Other measurement vectors were computed by taking natural images, computing the wavelet transform (known to sparsify natural images), removing a set number of small-magnitude coefficients to achieve a target sparsity, and then computing the inverse wavelet transform. A soft threshold function was used for $T_\lambda(u(t))$ with an initial threshold of one that was optimized for the target sparsity and PSNR of the result (see FIG. 11). Experimental simulations of the LCA typically produce all or nearly all nonzero coefficients in the correct locations, but error in the actual coefficient values averages 5-10% increasing with higher K. For example, for K=1, error is usually close to 1%, but for K=10, error averages 8%.

Two issues arise in using the LCA network for compressive sensing reconstruction. The essential error that it introduces has already been mentioned. A second issue is the network's connectivity: all nodes must be connected to all others, what we cal the "many wires" problem. A key insight into mitigating both of these problems revolves around choosing $\Theta$ directly to have several desired properties. Because the basis matrix $\Psi$ is predetermined, the relationship $\Theta=\Phi\Psi$ shows that choosing $\Theta$ amounts to choosing the measurement matrix $\Phi$, which must have specific properties to enable compressive sensing. Because $\Psi$ is an orthogonal matrix, $\Phi=\Theta\Psi^t$, an easily computed quantity. We propose choosing this matrix according to desirable properties we wish to impose on $\Theta$. One very effective choice is a random binary $\Theta$ (values −1 and 1) with all elements subsequently divided by $\sqrt{N}$ so that the diagonal matrix D=I. The compressive sensing constraints are not violated because an orthogonal transformation of a matrix of white noise is also white noise. Since D=I, equation (13) becomes $$\hat{s}=s-\lambda(\Theta^T\Theta)^{-1}1 \tag{14}$$

Using the binary $\Theta$ in our simulations, error was typically 5-10%. Although the reconstruction error is approximately the same as before, the D term's influence has been eliminated, simplifying the error expression and permitting greater control. As for the "many wires" problem, we want to choose the matrix $\Theta$ to have as many orthogonal columns as possible. In the way, the connection strength between nodes corresponding to these columns will be zero.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. An analog system for sparsely approximating a signal comprising:

a matching system for calculating and outputting matching signals representative of how well-matched said signal is to a plurality of dictionary elements; and a plurality of nodes, each node receiving one of said matching signals from said matching system, wherein each node comprises:

a source of an internal state signal; and a thresholding element;

wherein said internal state signal in each node is calculated as a function of said matching signal received at said node and weighted outputs of all other nodes.

2. An analog system for sparsely approximating a signal according to claim 1, wherein said matching system comprises a projection system for projecting a signal vector onto said plurality of dictionary elements.

3. An analog system for sparsely approximating a signal according to claim 1 wherein said source of an internal state signal comprises a low pass averaging system.

4. An analog system for sparsely approximating a signal according to claim 1 wherein each node further comprises a plurality of weighting elements for receiving an output of said thresholding element and providing a plurality of weighted outputs.

5. An analog system for sparsely approximating a signal according to claim 1 wherein each node further comprises a plurality of weighting elements, each weighting element receiving an output from another one of said plurality of nodes and providing a weighted output to said source of an internal state signal.

6. An analog system for sparsely approximating a signal according to claim 1 wherein said internal state signal is derived from said matching signal less a sum of weighted outputs from said other nodes.

7. An analog system for sparsely approximating a signal according to claim 1 wherein said signal comprises a video signal.

8. An analog system for sparsely approximating a signal according to claim 1 wherein said source of an activation signal comprises a voltage source.

9. An analog system for sparsely approximating a signal according to claim 3 wherein said low pass averaging system comprises a low pass averaging circuit.

10. An analog system for sparsely approximating a signal according to claim 8 wherein said low pass averaging circuit comprises a resistor and a capacitor.

11. An analog system for sparsely approximating a signal according to claim 1 wherein said source of an activation signal comprises a current source.

12. A parallel dynamical system for computing sparse representations of data comprising:

a projection system for projecting said data onto projection vectors; and a plurality of nodes, each node receiving one of said projection vectors from said projection system, wherein each node comprises:

a source of electrical energy;

a low pass averaging circuit; and a thresholding element;

wherein said source of electrical energy in each node comprises a projection vector received at said node less weighted outputs of all other nodes.

13. A parallel dynamical system for computing sparse representations of data according to claim 12 wherein each node further comprises a plurality of weighting elements, each weighting element receiving an output from another one of said plurality of nodes and providing said weighted output to said source of electrical energy.

14. A parallel dynamical system for computing sparse representations of data comprising:

a plurality of nodes, each node being active or inactive and each said node comprising:

a leaky integrator element, wherein inputs to said leaky integrator element cause an activation potential to charge up; and a thresholding element for receiving said activation potential and for producing an output coefficient, said output coefficient being the result of an activation function applied to said activation potential and parameterized by a system threshold;

wherein active nodes inhibits other nodes with inhibition signals proportional to both level of activity of said active nodes and a similarity of receptive fields of said active nodes.

* * * * *